(12) United States Patent
Migneco et al.

(10) Patent No.: US 11,679,706 B2
(45) Date of Patent: Jun. 20, 2023

(54) SEAT ASSEMBLY

(71) Applicant: Lear Corporation, Southfield, MI (US)

(72) Inventors: Francesco Migneco, Saline, MI (US); Sajad Arabnejad, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 69 days.

(21) Appl. No.: 17/109,652

(22) Filed: Dec. 2, 2020

(65) Prior Publication Data
US 2022/0169164 A1 Jun. 2, 2022

(51) Int. Cl.
*B60N 2/90* (2018.01)
*B60N 2/02* (2006.01)

(52) U.S. Cl.
CPC ........... *B60N 2/914* (2018.02); *B60N 2/99* (2018.02); *B60N 2/0244* (2013.01)

(58) Field of Classification Search
CPC ......... B60N 2/914; B60N 2/99; B60N 2/0244
See application file for complete search history.

(56) References Cited

U.S. PATENT DOCUMENTS

| | | |
|---|---|---|
| 5,769,490 A | 6/1998 | Falzon |
| 6,056,360 A | 5/2000 | Schneider |
| 6,079,485 A | 6/2000 | Esaki et al. |
| 6,088,642 A | 7/2000 | Finkelstein et al. |
| 6,088,643 A | 7/2000 | Long et al. |
| 6,098,000 A | 8/2000 | Long et al. |
| 6,179,378 B1 | 1/2001 | Baumgartner et al. |
| 6,345,839 B1 * | 2/2002 | Kuboki .......... B60R 21/01516 73/862.632 |
| 6,353,207 B1 | 3/2002 | Burt |
| 6,506,153 B1 | 1/2003 | Littek et al. |
| 6,559,422 B2 | 5/2003 | Burt |
| 6,682,494 B1 | 1/2004 | Sleichter, III et al. |
| 6,908,152 B2 | 6/2005 | McMillen |
| 7,011,369 B2 | 3/2006 | Massara et al. |
| 7,083,232 B2 | 8/2006 | Frank |
| 7,083,233 B2 | 8/2006 | Massara et al. |
| 7,152,920 B2 | 12/2006 | Sugiyama et al. |
| 7,201,446 B2 | 4/2007 | Massara et al. |
| 7,219,923 B2 | 5/2007 | Fujita et al. |
| 7,267,652 B2 | 9/2007 | Coyle et al. |

(Continued)

FOREIGN PATENT DOCUMENTS

| | | |
|---|---|---|
| CN | 2855822 Y | 1/2007 |
| CN | 203186154 U | 9/2013 |

(Continued)

OTHER PUBLICATIONS

Co-Pending U.S. Appl. No. 16/821,128, filed Mar. 17, 2020.

(Continued)

*Primary Examiner* — Syed A Islam
(74) *Attorney, Agent, or Firm* — Fishman Stewart PLLC

(57) ABSTRACT

A seat assembly may include a seat, a seat actuator, a sensor assembly, and an electrical control unit (ECU). The seat actuator may be configured to adjust the seat. The sensor assembly may be connected to the seat and may be configured to detect a pressure applied to the seat. The ECU may be operatively connected to the seat actuator and the sensor assembly. The ECU may be configured to reduce soft tissue stress in soft tissue of a user via adjusting the seat with the seat actuator.

11 Claims, 11 Drawing Sheets

(56) References Cited

U.S. PATENT DOCUMENTS

| | | |
|---|---|---|
| 7,303,231 B2 | 12/2007 | Frank |
| 7,314,451 B2 | 1/2008 | Halperin et al. |
| 7,417,536 B2 | 8/2008 | Lakshmanan et al. |
| 7,688,582 B2 | 3/2010 | Fukazu et al. |
| 7,731,279 B2 | 6/2010 | Asada et al. |
| 7,808,395 B2 | 10/2010 | Raisanen et al. |
| 7,828,050 B2 | 11/2010 | Esaki |
| 7,862,119 B2 | 1/2011 | Schafer et al. |
| 7,866,755 B2 | 1/2011 | Okano |
| 7,900,736 B2 | 3/2011 | Breed |
| 7,967,379 B2 | 6/2011 | Walters et al. |
| 7,967,381 B2 | 6/2011 | Sugiyama |
| 8,341,786 B2 | 1/2013 | Oexman et al. |
| 8,444,558 B2 | 5/2013 | Young et al. |
| 8,616,654 B2 | 12/2013 | Zenk et al. |
| 8,618,451 B2 | 12/2013 | Kunisada |
| 8,706,204 B2 | 4/2014 | Seo et al. |
| 8,710,784 B2 | 4/2014 | Meyer et al. |
| 8,725,311 B1 | 5/2014 | Breed |
| 8,794,707 B2 | 8/2014 | Bocsanyi et al. |
| 8,827,372 B2 | 9/2014 | Yoon |
| 8,958,955 B2 | 2/2015 | Hotary et al. |
| 8,971,839 B2 | 3/2015 | Hong |
| 8,979,191 B2 | 3/2015 | Friderich et al. |
| 8,989,697 B2 | 3/2015 | Leung et al. |
| 9,147,192 B2 | 9/2015 | Dawson et al. |
| 9,237,242 B2 | 1/2016 | Basir |
| 9,272,647 B2 | 3/2016 | Gawade et al. |
| 9,272,689 B2 | 3/2016 | Fung et al. |
| 9,277,385 B2 | 3/2016 | Iwamoto |
| 9,504,416 B2 | 11/2016 | Young et al. |
| 9,815,385 B2 | 11/2017 | Lippman et al. |
| 9,848,814 B2 | 12/2017 | Benson et al. |
| 9,883,821 B2 | 2/2018 | Muehlsteff |
| 9,978,283 B2 | 5/2018 | Jedrzejewski et al. |
| 9,980,680 B2 | 5/2018 | Matsumoto |
| 10,034,631 B1 | 7/2018 | Gallagher et al. |
| 10,210,409 B1 | 2/2019 | Migneco et al. |
| 10,213,147 B2 | 2/2019 | Gallagher et al. |
| 10,308,258 B2 | 6/2019 | Fung et al. |
| 10,328,823 B2 | 6/2019 | O'Bannon et al. |
| 10,358,065 B2 | 7/2019 | McMillen et al. |
| 10,369,074 B2 | 8/2019 | Oberg et al. |
| 10,379,535 B2 | 8/2019 | Migneco et al. |
| 10,391,900 B2 | 8/2019 | Zhao et al. |
| 10,470,968 B2 | 11/2019 | Saren et al. |
| 10,471,868 B2 | 11/2019 | Wheeler |
| 10,492,979 B2 | 12/2019 | Norman et al. |
| 10,556,532 B2 | 2/2020 | Gallagher et al. |
| 10,562,412 B1* | 2/2020 | Main .................. A61B 5/6893 |
| 10,569,668 B2 | 2/2020 | Migneco et al. |
| 10,576,855 B2 | 3/2020 | Dorfler et al. |
| 10,640,010 B2 | 5/2020 | Yetukuri et al. |
| 10,709,386 B2 | 7/2020 | Gallagher et al. |
| 10,807,439 B2 | 10/2020 | Migneco et al. |
| 10,898,708 B2 | 1/2021 | Franco-Obregon et al. |
| 11,504,540 B2* | 11/2022 | Lee .................. A61H 9/0078 |
| 2003/0039298 A1 | 2/2003 | Eriksson et al. |
| 2003/0075959 A1 | 4/2003 | Xue et al. |
| 2003/0209893 A1 | 11/2003 | Breed et al. |
| 2004/0119599 A1 | 6/2004 | Stevenson et al. |
| 2004/0129478 A1 | 7/2004 | Breed et al. |
| 2006/0244289 A1 | 11/2006 | Bedro |
| 2007/0118054 A1 | 5/2007 | Pinhas et al. |
| 2008/0161989 A1 | 7/2008 | Breed |
| 2008/0216567 A1 | 9/2008 | Breed |
| 2008/0255731 A1 | 10/2008 | Mita et al. |
| 2008/0267460 A1 | 10/2008 | Aoki et al. |
| 2008/0288406 A1 | 11/2008 | Seguin et al. |
| 2009/0008970 A1 | 1/2009 | Flory et al. |
| 2009/0030578 A1 | 1/2009 | Periot et al. |
| 2010/0087748 A1 | 4/2010 | Tobola et al. |
| 2011/0015468 A1 | 1/2011 | Aarts et al. |
| 2012/0080911 A1 | 4/2012 | Brykalski et al. |
| 2012/0086249 A1 | 4/2012 | Notary et al. |
| 2012/0089299 A1 | 4/2012 | Breed |
| 2012/0116149 A1 | 5/2012 | Pilla et al. |
| 2013/0090816 A1 | 4/2013 | Huber |
| 2013/0127210 A1 | 5/2013 | Jung et al. |
| 2013/0251216 A1 | 9/2013 | Smowton et al. |
| 2014/0070943 A1 | 3/2014 | Breed |
| 2014/0132042 A1 | 5/2014 | Midderhoff et al. |
| 2014/0207333 A1 | 7/2014 | Vandivier et al. |
| 2014/0319895 A1 | 10/2014 | Lange-Mao et al. |
| 2014/0361871 A1 | 12/2014 | Silva et al. |
| 2014/0375089 A1 | 12/2014 | Qureshi et al. |
| 2015/0048658 A1 | 2/2015 | Gawade et al. |
| 2015/0084985 A1 | 3/2015 | Baudu |
| 2015/0126916 A1 | 5/2015 | Hall et al. |
| 2015/0266405 A1 | 9/2015 | Fitzpatrick et al. |
| 2015/0313475 A1 | 11/2015 | Benson et al. |
| 2015/0351692 A1 | 12/2015 | Pereny et al. |
| 2015/0352979 A1 | 12/2015 | O'Bannon et al. |
| 2015/0352990 A1 | 12/2015 | Zouzal et al. |
| 2015/0375653 A1 | 12/2015 | Josefsson et al. |
| 2016/0001781 A1 | 1/2016 | Fung et al. |
| 2016/0003882 A1 | 1/2016 | Loftus |
| 2016/0129920 A1* | 5/2016 | Hall .................. B60N 2/665 701/1 |
| 2016/0143803 A1 | 5/2016 | Portales |
| 2016/0176409 A1 | 6/2016 | Kirsch et al. |
| 2016/0250956 A1 | 9/2016 | Seiting et al. |
| 2016/0278709 A1 | 9/2016 | Ridao Granado et al. |
| 2017/0043681 A1 | 2/2017 | Seiller et al. |
| 2017/0086588 A1 | 3/2017 | Patrick et al. |
| 2017/0225591 A1 | 8/2017 | Tobata et al. |
| 2017/0274906 A1 | 9/2017 | Hassan et al. |
| 2017/0349061 A1 | 12/2017 | Benson et al. |
| 2017/0361748 A1 | 12/2017 | Meachum et al. |
| 2018/0008507 A1 | 1/2018 | Saren et al. |
| 2018/0009343 A1 | 1/2018 | Saren et al. |
| 2018/0015853 A1 | 1/2018 | Lem et al. |
| 2018/0065642 A1 | 3/2018 | Frye et al. |
| 2018/0110960 A1 | 4/2018 | Youngblood et al. |
| 2018/0178692 A1 | 6/2018 | Zhao et al. |
| 2018/0178808 A1 | 6/2018 | Zhao et al. |
| 2018/0215293 A1 | 8/2018 | Gandhi et al. |
| 2018/0325264 A1 | 11/2018 | Gallagher et al. |
| 2018/0345833 A1 | 12/2018 | Gallagher et al. |
| 2018/0361897 A1 | 12/2018 | Lem et al. |
| 2019/0053761 A1 | 2/2019 | Young et al. |
| 2019/0054796 A1 | 2/2019 | Thomas |
| 2019/0126036 A1 | 5/2019 | Franco-Obregon et al. |
| 2019/0133511 A1 | 5/2019 | Migneco et al. |
| 2019/0168771 A1 | 6/2019 | Migneco et al. |
| 2019/0193591 A1 | 6/2019 | Migneco et al. |
| 2019/0239815 A1 | 8/2019 | Gallagher et al. |
| 2019/0275860 A1 | 9/2019 | Migneco et al. |
| 2019/0332902 A1 | 10/2019 | Gallagher et al. |
| 2019/0337412 A1 | 11/2019 | Zouzal et al. |
| 2019/0337431 A1 | 11/2019 | McMillen et al. |
| 2019/0344043 A1* | 11/2019 | Migneco .............. B60N 2/0244 |
| 2020/0035237 A1 | 1/2020 | Kim et al. |
| 2020/0113344 A1 | 4/2020 | Youngblood et al. |
| 2020/0170576 A1 | 6/2020 | Lerner |
| 2020/0188211 A1 | 6/2020 | Ellermann |
| 2020/0231428 A1 | 7/2020 | Migneco et al. |
| 2020/0238875 A1 | 7/2020 | Godlewski et al. |
| 2020/0253381 A1 | 8/2020 | Dorfler et al. |
| 2020/0324675 A1 | 10/2020 | Yamamoto et al. |
| 2021/0016686 A1 | 1/2021 | Yetukuri et al. |

FOREIGN PATENT DOCUMENTS

| | | |
|---|---|---|
| CN | 104252615 A | 12/2014 |
| CN | 205468657 U | 8/2016 |
| DE | 10027686 A1 | 1/2002 |
| DE | 10063478 A1 | 7/2002 |
| DE | 102004010626 A1 | 6/2005 |
| DE | 102004013674 A1 | 10/2005 |
| DE | 102006029871 A1 | 1/2008 |
| DE | 102008029339 A1 | 1/2009 |
| DE | 102009008421 A1 | 10/2009 |
| DE | 102009035566 A1 | 2/2010 |

(56) References Cited

FOREIGN PATENT DOCUMENTS

| | | |
|---|---|---|
| DE | 102009031331 A1 | 8/2010 |
| DE | 102009033041 A1 | 1/2011 |
| DE | 102010021332 A1 | 1/2011 |
| DE | 102007006866 B4 * | 11/2011 ............. B60N 2/002 |
| DE | 102011012431 A1 | 11/2011 |
| DE | 102011016073 A1 | 12/2011 |
| DE | 102011017238 A1 | 12/2011 |
| DE | 102011102021 A1 | 11/2012 |
| DE | 102011113100 A1 | 3/2013 |
| DE | 102011116194 A1 | 4/2013 |
| DE | 102012201430 A1 | 4/2013 |
| DE | 102012216869 A1 | 3/2014 |
| DE | 202015104103 U1 | 8/2015 |
| DE | 102014002942 A1 | 9/2015 |
| DE | 102015011460 A1 | 3/2016 |
| DE | 102015011461 A1 | 3/2016 |
| DE | 102017110812 A1 | 1/2018 |
| DE | 102016011481 A1 | 3/2018 |
| DE | 202017103162 U1 | 5/2018 |
| DE | 102018000765 A1 | 8/2019 |
| DE | 102018001230 A1 | 8/2019 |
| DE | 202019100400 U1 | 1/2020 |
| DE | 202019100710 U1 | 2/2020 |
| DE | 102018007921 A1 | 4/2020 |
| DE | 202019102879 U1 | 5/2020 |
| DE | 202019105369 U1 | 5/2020 |
| DE | 102019008724 A1 | 8/2020 |
| EP | 1077154 A2 | 2/2001 |
| EP | 1749477 A1 | 2/2007 |
| EP | 1932715 A1 | 6/2008 |
| EP | 2149475 A1 | 2/2010 |
| EP | 2205460 B1 | 3/2016 |
| FR | 2988654 A1 | 10/2013 |
| GB | 2512136 A | 9/2014 |
| JP | 2001269380 A | 10/2001 |
| JP | 2005137896 A | 6/2005 |
| JP | 2005237456 A | 9/2005 |
| JP | 2006014756 A | 1/2006 |
| JP | 3857869 B2 | 12/2006 |
| JP | 2009172145 A | 8/2009 |
| JP | 2012196253 A | 10/2012 |
| JP | 2013163405 A | 8/2013 |
| JP | 2019131049 A | 8/2019 |
| WO | 2011144280 A1 | 11/2011 |
| WO | 2012039368 | 3/2012 |

OTHER PUBLICATIONS

Co-Pending U.S. Appl. No. 15/930,777, filed May 13, 2020.
Co-Pending U.S. Appl. No. 15/930,802, filed May 13, 2020.
Co-Pending U.S. Appl. No. 15/930,835, filed May 13, 2020.
Co-Pending U.S. Appl. No. 15/930,865, filed May 13, 2020.

* cited by examiner

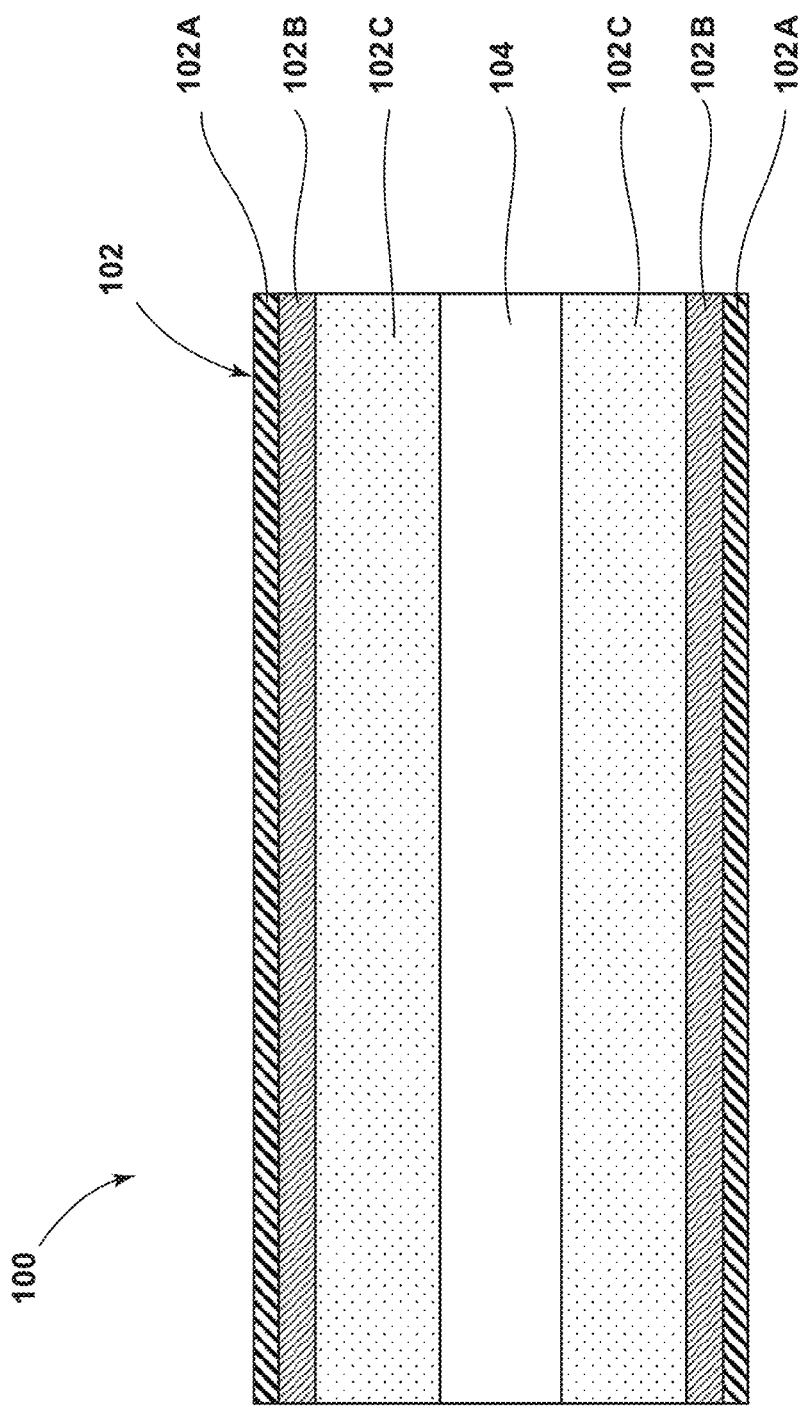

SEAT ASSEMBLY

TECHNICAL FIELD

The present disclosure generally relates to seat assemblies, including seat assemblies that may improve user comfort, such as via reducing stress in soft tissue.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assemblies may not be comfortable, may not provide sufficient functionality, may not be configured to monitor and/or reduce stress in the soft tissue of a user, and/or may not be configured to reduce lateral bulging in soft tissue of a user to increase user comfort. For example and without limitation, some seat assemblies may not be configured to apply force and/or pressure to portions of a user to improve blood flow to areas of soft tissue of a user.

There is a desire for solutions/options that minimize or eliminate one or more challenges or shortcomings of seat assemblies. The foregoing discussion is intended only to illustrate examples of the present field and is not a disavowal of scope.

SUMMARY

In embodiments, a seat assembly may include a seat, a seat actuator, a sensor assembly, and/or an electrical control unit (ECU). The seat actuator may be configured to adjust the seat. The sensor assembly may be connected to the seat and may be configured to detect a pressure applied to the seat. The ECU may be operatively connected to the seat actuator and the sensor assembly. The ECU may be configured to reduce soft tissue stress in soft tissue of a user via adjusting the seat with the seat actuator.

In embodiments, a method of operating a seat assembly that may include a seat, a seat actuator connected to the seat, a sensor assembly connected to the seat, and/or an electrical control unit (ECU) operatively connected to the seat actuator and the sensor assembly is described. The method may include detecting, via the sensor assembly, a pressure applied to the seat by a user, comparing the detected pressure to a specified pressure or pressure threshold via the ECU, and, if the detected pressure exceeds the specified pressure or pressure threshold, reducing soft tissue stress in soft tissue of a user via adjusting the seat with the seat actuator.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIG. 5A is a simplified cross-sectional view of a portion of a physiological composition/structure of a user in the context of teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
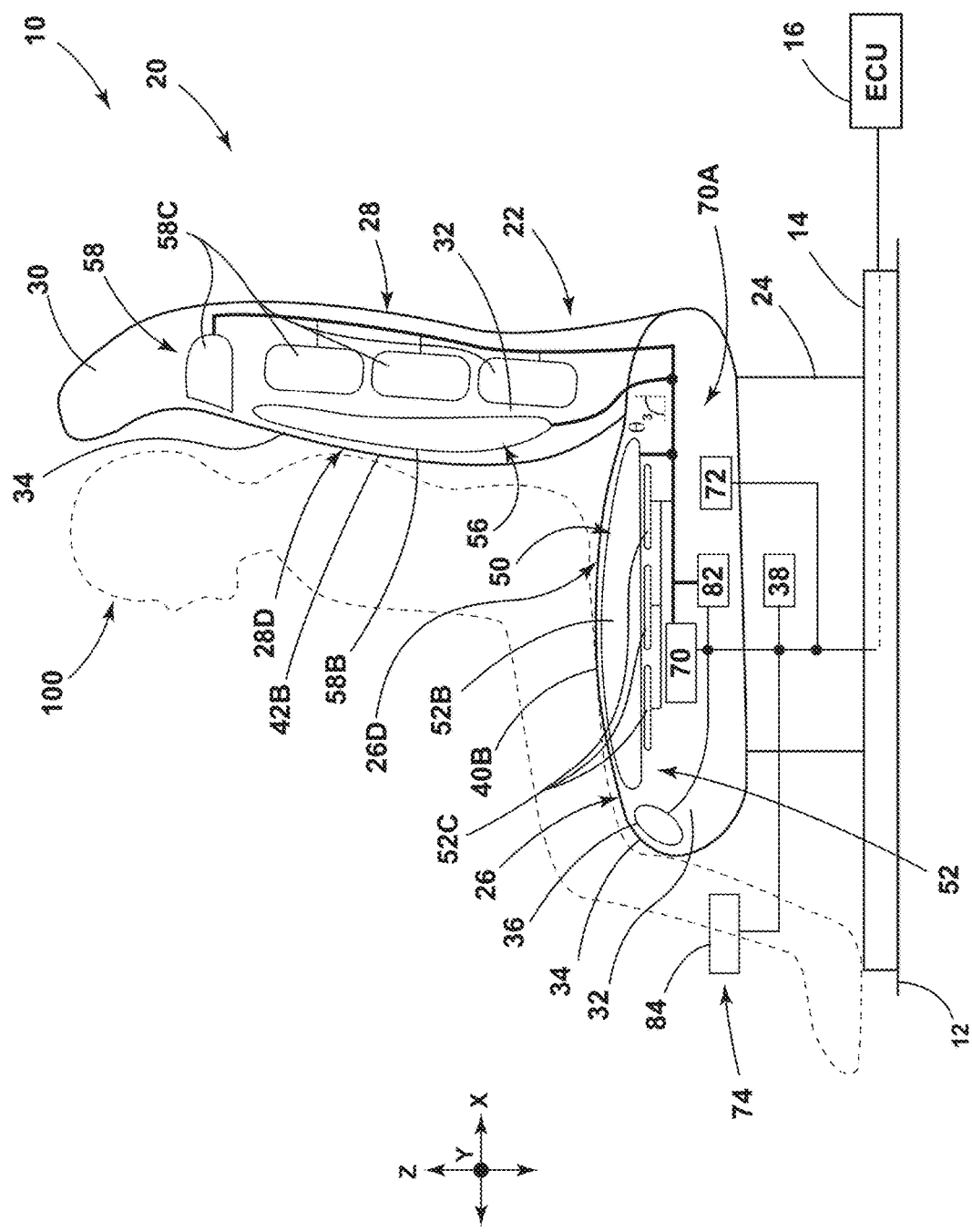
FIG. 1 is a side view generally illustrating an embodiment of a seat assembly according to teachings of the present disclosure.
Figure 2:
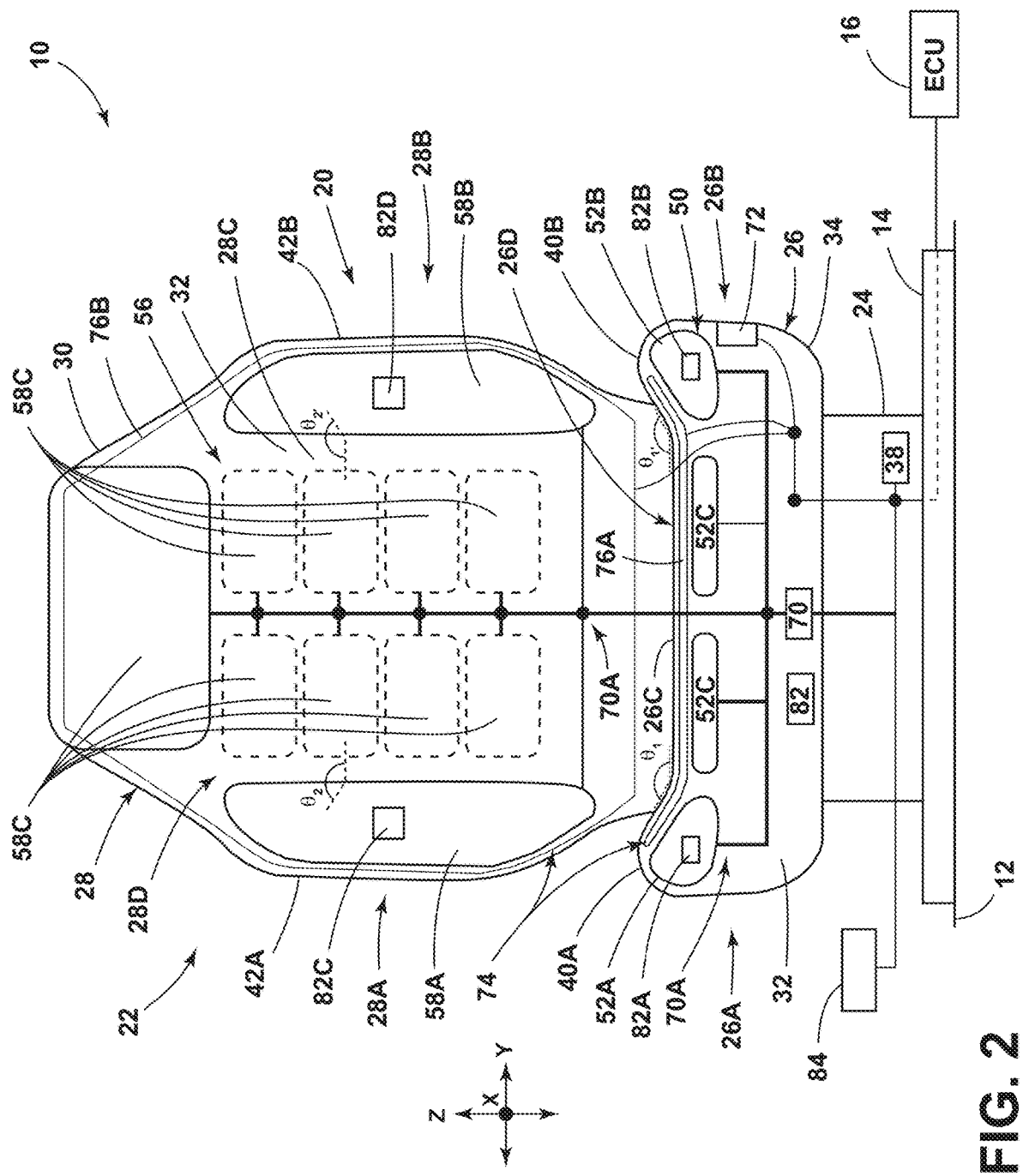
FIG. 2 is a front view generally illustrating an embodiment of a seat assembly according to teachings of the present disclosure.

In embodiments, such as generally illustrated in FIGS. 1 and 2, a vehicle 10 may include a mounting surface 12, a track/rail assembly 14, an electronic control unit (ECU) 16, and/or a seat assembly 20. A seat assembly 20 may include at least one seat 22. The seat 22 may be selectively connected (e.g., electrically and/or mechanically) to a track assembly 14. The ECU 16 may be electrically connected to the seat 22, such as via the track assembly 14. The ECU 16 may be configured to at least partially control operation of the seat 22. The seat 22 may be connected with the track assembly 14 via a support member 24. The support member 24 may be selectively connected with the track assembly 14. For example and without limitation, the support member 24 may be configured to be inserted vertically (e.g., in the Z-direction) and/or horizontally (e.g., in the X-direction and/or Y-direction) into the track assembly 14, and may be configured to be removed vertically and/or horizontally from the track assembly 14, such as in numerous positions along the track assembly 14. The support member 24 may be configured to move along the track assembly 14 (e.g., in the X-direction and/or Y-direction).

In embodiments, such as generally illustrated in FIGS. 1 and 2, the track assembly 14 may be disposed on a mounting surface 12 (e.g., a vehicle floor). The track assembly 14 may be configured to receive the seat 22. The track assembly 14 may include one or more of a variety of shapes, sizes, and/or configurations. For example and without limitation, the track assembly 14 may extend in an X-direction and/or a Y-direction such that the seat 22 may move in an X-direction and/or a Y-direction along the track assembly 14. In some embodiments, a seat 22 and/or a support member 24 may be connected to a mounting surface 12 independently of a track assembly 14 (e.g., a seat assembly 20 may not include a track assembly 14).

With embodiments, such as generally illustrated in FIGS. 1 and 2, a seat 22 may include a seat base 26, a seat back 28, a headrest 30, one or more seat cushions 32, a seat cover 34 (e.g., a seat trim), a leg support 36, and/or a seat actuator 38. Either or both of the seat base 26 and the seat back 28 may be adjustably connected to one another and/or configured for selective adjustment/movement relative to one another and/or the mounting surface 12, such as via the seat actuator 38 (e.g., one or more electric motors). A headrest 30 may be connected to the seat back 28 opposite the seat base 26 (e.g., at the top of the seat back 28) and may be adjustable via the seat actuator 38. A leg support 36 may be connected to the seat base 26 opposite the seat back 28 (e.g., at the front of the seat base 26). The leg support 36 may be configured for selective adjustment (e.g., pivoting, sliding, etc.) relative to the seat base 26, the seat back 28, and/or the mounting surface 12. A seat base 26, a seat back 28, and/or a headrest 30 may include one or more cushions 32 configured to cushion and/or support a user. A seat cover 34 may be disposed on and/or wrapped around the seat 22 to at least partially surround and conceal various components of the seat 22 (e.g., the seat cushions 32, leg support 36, bolsters, etc.). A seat cover 34 may be configured as a single piece/component and/or multiple components. In examples, a seat cover 34 may be configured as a seat trim including several pieces/components, which may each be disposed on and/or at least partially surround a corresponding portion of the seat 22.

With embodiments, such as generally illustrated in FIG. 2, the seat base 26 and/or seat back 28 may include one or more bolsters 40A, 40B, 42A, 42B. A bolster 40A, 40B, 42A, 42B may, for example and without limitation, include a generally triangular and/or ramped cross-sectional shape. A bolster may be configured to effectively "push" a portion of an occupant user away from an associated respective surface. The seat base 26 may include a first base bolster 40A and/or a second base bolster 40B, and/or the seat back 28 may include a first back bolster 42A and/or a second back bolster 42B. A bolster 40A, 40B, 42A, 42B may be configured to contact one or more sides of a user 100, such as to at least partially surround a physical portion of a user 100. A bolster 40A, 40B, 42A, 42B may be adjustable by a seat actuator 38. For example and without limitation, a bolster 40A, 40B, 42A, 42B may be adjustable by a bladder assembly 50, 56 and/or any other type mechanical adjustment assembly of the seat actuator 38.

With embodiments, such as generally illustrated in FIG. 2, a first base bolster 40A may extend along a first side 26A of the seat base 26 (e.g., in an X-direction) and/or the second base bolster 40B may extend along a second side 26B of the seat base 26 (e.g., in an X-direction). The first side 26A of the seat base 26 may be opposite the second side 26B. The first base bolster 40A and/or the second base bolster 40B may, for example, extend upward (e.g., in a Z-direction) to a greater extent than other portions of the seat base 26 (e.g., a main portion 26C), which may provide the seat base 26 with a generally U-shaped configuration. The first base bolster 40A and/or the second base bolster 40B may, at least in some circumstances, contact and/or abut the legs (e.g., thighs), the hips, and/or the posterior of a user 100 (e.g., in the Y-direction and/or Z-direction). The first base bolster 40A and/or the second base bolster 40B may be adjustable relative to the main portion 26C of the seat base 26. For example and without limitation, the first base bolster 40A may be pivotable relative to the main portion 26C of the seat base 26 (e.g., pivotable about an axis extending generally in an X-direction) to adjust an angle $\theta_1$ defined between the first base bolster 40A and the main portion 26C, and/or the second base bolster 40B may be pivotable relative to the main portion 26C of the seat base 26 (e.g., pivotable about an axis extending generally in the X-direction) to adjust an angle $\theta_{1'}$ defined between the second base bolster 40B and the main portion 26C. Additionally and/or alternatively, the base bolsters 40A, 40B may be moved and/or slide relative to the main portion 26C of the seat base 26, such as to adjust the extent by which the base bolsters 40A, 40B protrude from the seat the seat base 26 (e.g., in the Z-direction, in the Y-direction, etc.). Adjusting the position of the base bolsters 40A, 40B may reduce and/or expand a distance between the first base bolster 40A and the second base bolster 40B.

In embodiments, such as generally illustrated in FIG. 2, a first back bolster 42A and/or a second back bolster 42B may extend along a side 28A, 28B of the seat back 28 (e.g., in a Z-direction when the seat back 28 is in an upright configuration). For example and without limitation, the first back bolster 42A may extend from a first side 28A of the seat back 28 (e.g., in a X-direction), and/or the second back bolster 42B may extend from a second side 28B of the seat back 28 (e.g., in a X-direction), which may provide the seat back 28 with a generally U-shaped configuration. The first side 28A of the seat back 28 may be opposite the second side 28B of the seat back 28. When a user 100 is occupying the seat 22, the first back bolster 42A and/or the second back bolster 42B may, for example, contact the shoulders, the torso, and/or the waist of the user 100 (e.g., in the X-direction and/or Y-direction), at least in some circumstances. The first back bolster 42A and/or the second back bolster 42B may be adjustable relative to a main portion 28C of the seat back 28. For example and without limitation, the first back bolster 42A may be pivotable relative to the main portion 28C of the seat back 28 (e.g., pivotable about an axis extending generally in the Z-direction) to adjust an angle $\theta_2$ defined between the first back bolster 42A and the main portion 28C, and/or the second back bolster 42B may be pivotable relative to the main portion 28C of the seat back 28 (e.g., pivotable about an axis extending generally in the Z-direction) to adjust an angle $\theta_{2'}$ defined between the second back bolster 42B and the main portion 28C. Additionally and/or alternatively, the back bolsters 42A, 42B may be moved and/or slide relative to the main portion 28C of the seat back 28, such as to adjust the extent by which the back bolsters 42A, 42B protrude from the seat back 28 (e.g., in the X-direction, in the Y-direction, etc.). Adjusting the position of the back bolsters 42A, 42B may reduce and/or expand a distance between the first back bolster 42A and the second back bolster 42B.

In embodiments, such as generally illustrated in FIGS. 1 and 2, a seat assembly 20 and/or a seat actuator 38 may include a first bladder assembly 50. The first bladder assembly 50 may be connected to and/or integrated within the seat base 26. The first bladder assembly 50 may include one or more bladders 52. For example and without limitation, the first bladder assembly 50 may include a first base-bolster bladder 52A, a second base-bolster bladder 52B, and/or one or more base bladders 52C. The first base-bolster bladder 52A may be associated with and/or disposed at least partially in the first base bolster 40A. The second base-bolster bladder 52B may be associated with and/or disposed at least partially in the second base bolster 40B. The base-bolster bladders 52A, 52B may, for example, be disposed such that inflation of one or more of the base-bolster bladders 52A, 52B applies pressure and/or force (e.g., via base bolsters 40A, 40B) to or upon a user 100 in an X-direction, a Y-direction, and/or a Z-direction. For example and without limitation, inflating the first base-bolster bladder 52A and the second base-bolster bladder 52B may apply pressure(s) and/or force(s) (e.g., via base bolsters 40A, 40B) to lower portions of a user 100 (e.g., thighs, waist, hips, posterior, etc.), such as in a direction perpendicular to a surface of the base bolster 40A, 40B contacting a user 100. The Y-component of a force applied to a user 100 by the first base bolster 40A and the Y-component of a force applied to a user 100 by the second base bolster 40B may be oriented in opposing directions (e.g., extend in substantially opposite Y-directions). The Z-component of a force applied to a user 100 by the first base bolster 40A and the Z-component of a force applied to a user 100 by the second base bolster 40B may be oriented in the same direction (e.g., upward in the Z-direction). The base bladders 52C may be associated with and/or disposed at least partially in the main portion 26C of the seat base 26.

In embodiments, such as generally illustrated in FIGS. 1 and 2, the seat assembly 20 and/or a seat actuator 38 may include a second bladder assembly 56. The second bladder assembly 56 may be connected to and/or integrated within the seat back 28. The second bladder assembly 56 may include one or more bladders 58. For example and without limitation, the second bladder assembly 56 may include a first back-bolster bladder 58A, a second back-bolster bladder 58B, and/or one or more back bladders 58C. The first back-bolster bladder 58A may be associated with and/or disposed at least partially in the first back bolster 42A. The second back-bolster bladder 58B may be associated with and/or disposed at least partially in the second back bolster 42B. The back-bolster bladders 58A, 58B may, for example, be disposed such that inflation of one or more of the back-bolster bladders 58A, 58B applies pressure and/or force (e.g., via back bolsters 42A, 42B) to or upon a user 100 in an X-direction, a Y-direction, and/or a Z-direction. For example and without limitation, inflating the first back-bolster bladder 58A and the second back-bolster bladder 58B may apply pressure(s) and/or force(s) to upper portions of a user 100 (e.g., torso, abdomen, the shoulders, neck, etc.), such as in a direction perpendicular to a surface of the back bolster 42A, 42B contacting a user 100. The Y-component of a force applied to a user 100 by the first back bolster 42A and the Y-component of a force applied to a user 100 by the second back bolster 42B may be oriented in opposing directions (e.g., extend in substantially opposite Y-directions). The X-component of a force applied to a user 100 by the first back bolster 42A and the X-component of a force applied to a user 100 by the second back bolster 42B may be oriented in the same direction (e.g., forward in the X-direction). The back bladders 58C may be associated with and/or disposed at least partially in the main portion 28C of the seat back 28.

With embodiments, such as generally illustrated in FIGS. 1 and 2, the first bladder assembly 50 and/or the second bladder assembly 56 may be connected, at least indirectly, with the ECU 16 (e.g., via a wired and/or wireless connection) such that the ECU 16 may be configured to control operation of the bladders 52, 58. The ECU 16 may independently control the first bladder assembly 50 and/or the second bladder assembly 56. For example and without limitation, the ECU 16 may be configured to inflate and/or deflate the first bladder assembly 50 while inflating and/or deflating the second bladder assembly 56. The ECU 16 may be connected to and/or configured to control a fluid source 70 to inflate and/or deflate one or more of the bladders 52, 58 of the bladder assemblies 50, 56. The fluid source 70 may, for example and without limitation, include a fluid pump, a fan, a fluid reservoir, and/or one or more control valves, among other components, that may be configured to selectively provide fluid (e.g., air) to and/or remove fluid from the bladder assemblies 50, 56. For example and without limitation, the fluid source 70 may be in fluid communication with the bladder assemblies 50, 56 via one or more fluid conduits 70A (e.g., tubes, hoses, ducts, etc.).

In embodiments, such as generally illustrated in FIG. 2, the ECU 16 may inflate and/or deflate the bladders 52, 58 to increase and/or decrease the flexibility of and/or the support provided by the main portion 26C of the seat base 26, the main portion 28C of the seat back 28, and/or the bolsters 40A, 40B, 42A, 42B. Inflating the base bladders 52C may increase the rigidity and/or decrease the flexibility of the main portion 26C of the seat base 26. Inflating the back bladders 58C may increase the rigidity and/or decrease the flexibility of the main portion 28C of the seat back 28. Inflating the bolster bladders 52A, 52B, 58A, 58B may increase the rigidity and/or decrease the flexibility of the bolsters 40A, 40B, 42A, 42B such that movement of a user 100 is at least partially limited (or at least more limited than prior to inflation). Deflating the bolster bladders 52A, 52B, 58A, 58B may increase the flexibility and/or reduce the rigidity of the bolsters 40A, 40B, 42A, 42B such that the bolster bladders 52A, 52B, 58A, 58B limit movement of a user 100 to a lesser degree than when inflated to a greater extent.

With embodiments, such as generally illustrated in FIGS. 1 and 2, a seat assembly 20 may include a seat actuator 38. The seat actuator 38 may be configured to adjust a seat base 26, a seat back 28, and/or one or more bolsters 40A, 40B, 42A, 42B. In examples, the seat actuator 38 may include a first and/or second bladder assembly 50, 56. The seat actuator 38 may be configured to adjust the position of a seat 22, rotate the seat 22, tilt the seat 22, and/or provide one or more adjustments. The seat actuator 38 may be configured to change (e.g., adjust) an angle $\theta_3$ between the seat base 26 and the seat back 28. The seat actuator 38 may be configured to raise and lower a headrest 30. The seat actuator 38 may be configured to change an angle between the seat base 26 and the mounting surface 12. The seat actuator 38 may be configured to adjust an angle of the leg support 36 relative to the seat base 26 and/or slide the leg support 36 relative to the seat base 26.

In embodiments, such as generally illustrated in FIGS. 1 and 2, a seat actuator 38 may be automatically controlled by an ECU 16 and/or may be manually controlled by a user, such as via a user interface 72. A user interface 72 may, for example, be disposed on, in, and/or proximate the seat 22 (e.g., the seat base 26). The user interface 72 may, for example, receive commands via one or more inputs from a user 100 (e.g., audio input, motion input, physical input, etc.). The ECU 16 may be configured to control the seat actuator 38 according to input from a user 100 that may be provided via a user interface 72.

In embodiments, such as generally illustrated in FIGS. 1 and 2, a seat assembly 20 may include a sensor assembly 74. The sensor assembly 74 may be connected to the ECU 16 to transmit information to the ECU 16 and/or the ECU 16 may be configured to analyze the information from the sensor assembly 74.

With embodiments, as generally shown in FIG. 2, a sensor assembly 74 may include one or more sensor arrays 76A, 76B. A sensor array 76A, 76B may be disposed substantially proximate a surface of the seat 22 such as to increase the accuracy of sensed information. A sensor array 76A, 76B may be disposed at least partially in the seat base 26 and/or the seat back 28, and/or may be disposed in another location (e.g., in a vehicle cabin). A sensor array 76A, 76B may be disposed between one or more seat cushions 32 and a seat cover 34 (e.g., seat trim). Additionally and/or alternatively, a sensor array 76A, 76B may be disposed and/or integrated within one or more seat cushions 32 and/or a seat cover 34. A sensor array 76A, 76B may be electrically connected (e.g., via wired and/or wireless connection) with the ECU 16. The ECU 16 may be configured to receive information from a sensor array 76A, 76B.

Figure 3:
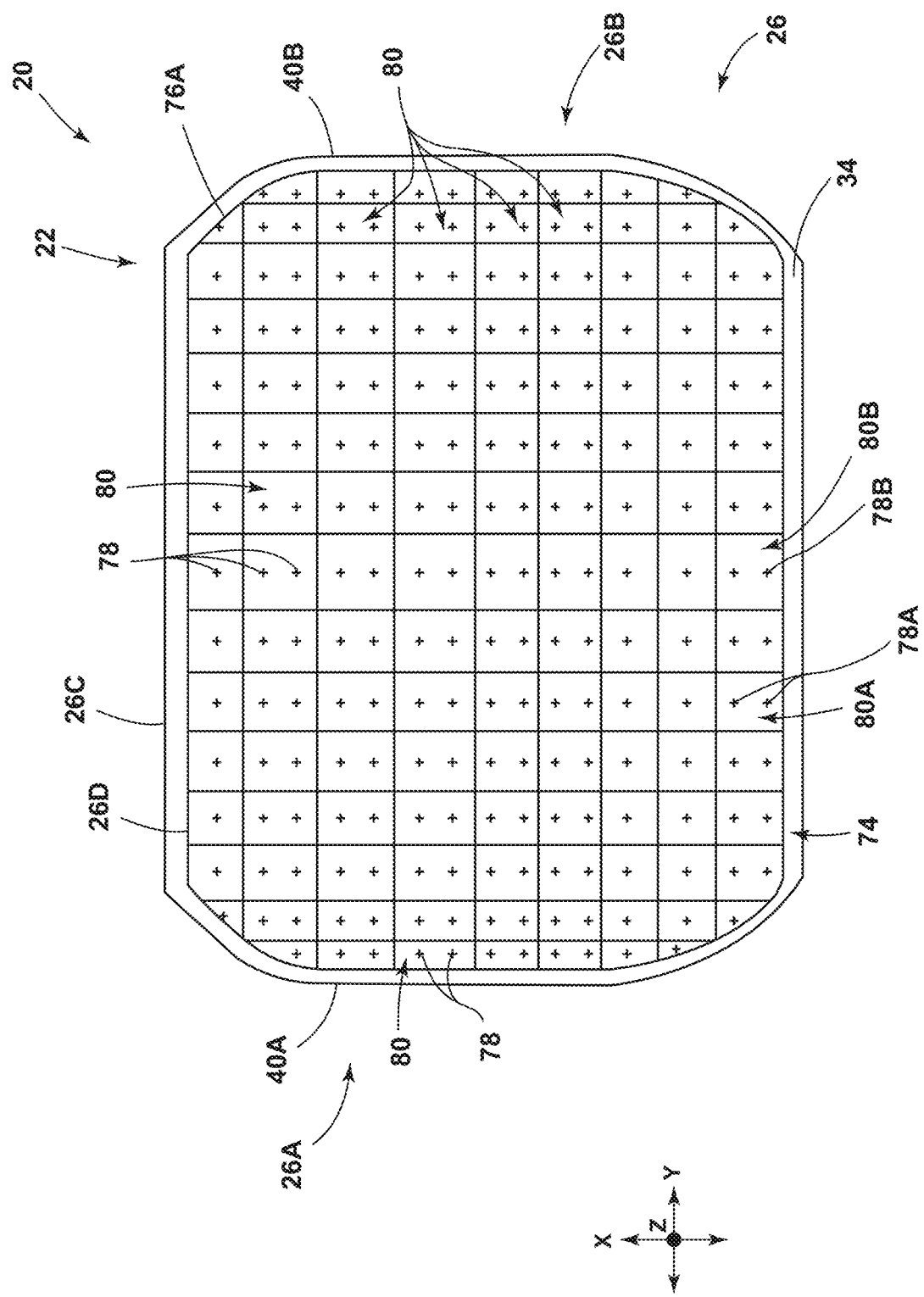
FIG. 3 is a top down view generally illustrating an embodiment of a seat base according to teachings of the present disclosure.
Figure 4:
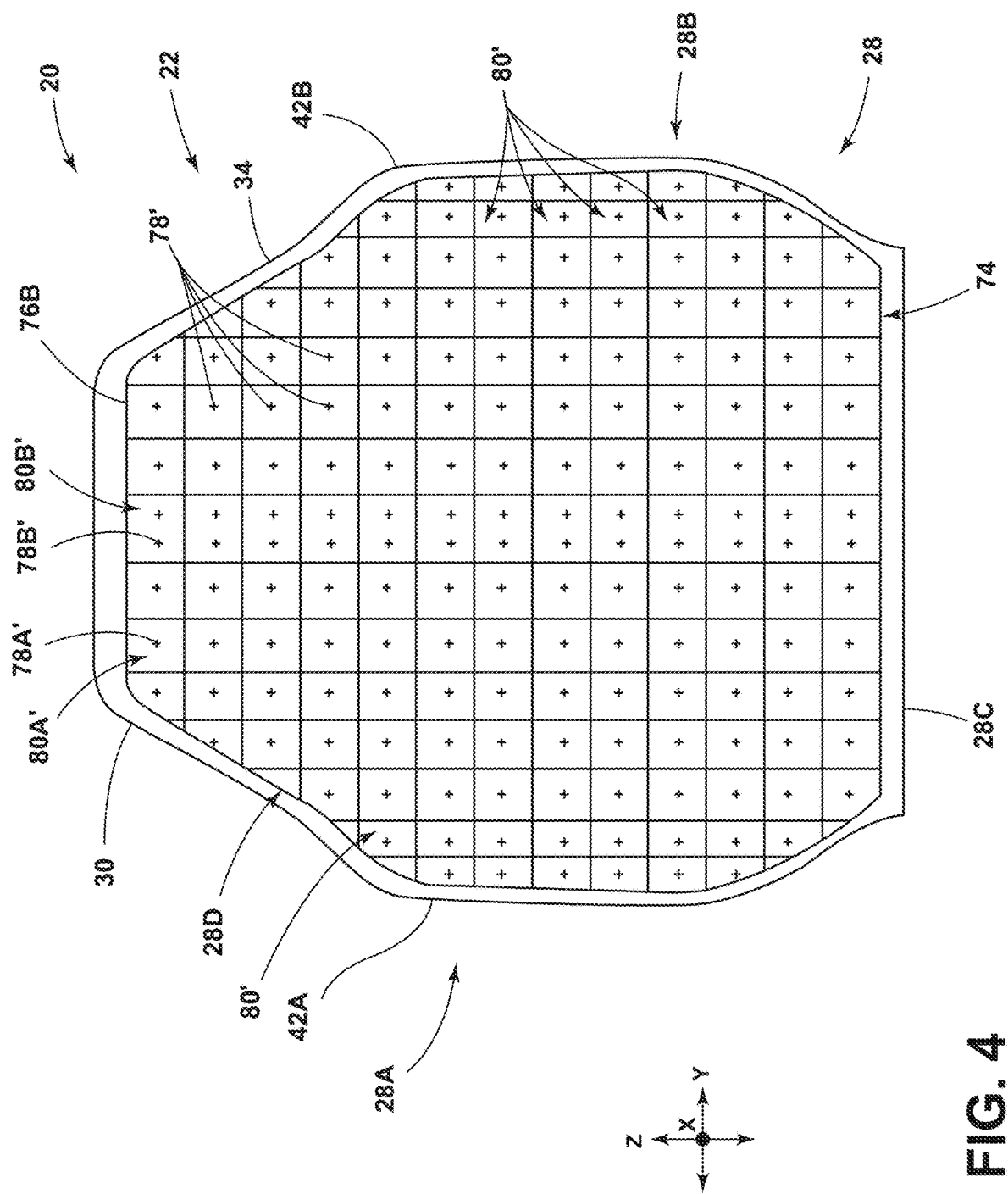
FIG. 4 is a front view generally illustrating an embodiment of a seat back according to teachings of the present disclosure.

With embodiments, such as generally shown in FIGS. 3 and 4, a sensor array 76A, 76B may include one or more sensors 78, 78' (e.g., pressure sensors). The sensors 78, 78' of a sensor array 76A, 76B may be disposed spaced apart from one another such that each sensor 78, 78' is associated with a different region 80, 80' of a surface of the seat 22. In examples, the sensors 78, 78' of a sensor array 76A, 76B may be disposed in a series of columns and rows to form a matrix and/or array, and/or may be disposed in any other manner to provide a desired pattern (e.g., concentric circles, the typical contact pattern when a user 100 sits on the seat, etc.) and/or a desired distribution of sensors 78, 78'.

With embodiments, as generally shown in FIG. 3, a first sensor array 76A may be connected to and/or disposed at least partially in the seat base 26. A first sensor array 76A may be disposed substantially proximate a first surface 26D of the seat base 26. The first surface 26D may be defined/formed by one or portions, areas, surfaces, etc. of a main portion 26C, a first base bolster 40A, and/or a second base bolster 40B of the seat base 26. A first sensor array 76A may be configured to detect a localized pressure applied to each region 80 of the first surface 26D, such as by a user 100 sitting on the seat base 26. Each region 80 of the first surface 26D may be associated with one or more sensors 78 of a first sensor array 76A and/or the sensors 78 of the first sensor array 76A may each be disposed in and/or in alignment with a corresponding region 80 of the first surface 26D (e.g., a first sensor 78A associated and/or aligned with a first region 80A, a second sensor 78B associated and/or aligned with a second region 80B, etc.).

With embodiments, as generally shown in FIG. 4, a second sensor array 76B may be connected to and/or disposed at least partially in the seat back 28. A second sensor array 76B may be disposed substantially proximate a second surface 28D of the seat back 28 against which a user rests their back when sitting in the seat 22. The second surface 28D may be defined/formed by one or portions, areas, surfaces, etc. of a main portion 28C, a first back bolster 42A, and/or a second back bolster 42B of the seat back 28. A second sensor array 76B may be configured to detect a localized pressure applied to each region 80' of the second surface 28D, such as by a user 100 sitting on the seat 22. Each region 80' of the second surface 28D may be associated with one or more sensors 78' of a second sensor array 76B, and/or the sensors 78' of the second sensor array 76B may each be disposed in and/or aligned with a corresponding region 80' of the second surface 28D (e.g., a first sensor 78A' associated and/or aligned with a first region 80A', a second sensor 78B' associated and/or aligned with a second region 80B', etc.).

With embodiments, such as generally shown in FIGS. 1 and 2, a sensor assembly 74 may include an occupant sensor assembly 84 configured to collect information and/or data corresponding to the identity of a user 100 and/or characteristics of a user 100 (e.g., gender, height, weight, anthropometric values/measures, etc.). For example and without limitation, an occupant sensor assembly 84 may include an optical sensor, a lidar sensor, a camera, etc.

In embodiments, such as generally illustrated in FIG. 2, a seat assembly 20 may include a fluid sensor 82 (e.g., a fluid pressure sensor). The fluid sensor 82 may be configured to measure fluid pressures of the bladders 52, 58 of the bladder assemblies 50, 56. The fluid sensor 82 may include a first sensor portion 82A, a second sensor portion 82B, a third sensor portion 82C, and/or a fourth sensor portion 82D. The first sensor portion 82A may be disposed at least partially within and/or be connected to the first base-bolster bladder 52A, the second sensor portion 82B may be disposed at least partially within and/or be connected to the second base-bolster bladder 52B, the third sensor portion 82C may be disposed at least partially within and/or be connected to the first back-bolster bladder 58A, and/or the fourth sensor portion 82D may be disposed at least partially within and/or be connected to the second back-bolster bladder 58B. The sensor portions 82A-82D may be configured to sense/measure pressures within the respective bladders 50A, 50B, 52A, 52B. The fluid sensor 82 may be connected with the ECU 16 (e.g., via a wired and/or wireless connection) such that the ECU 16 may receive pressure information from the fluid sensor 82.

Figure 5B:
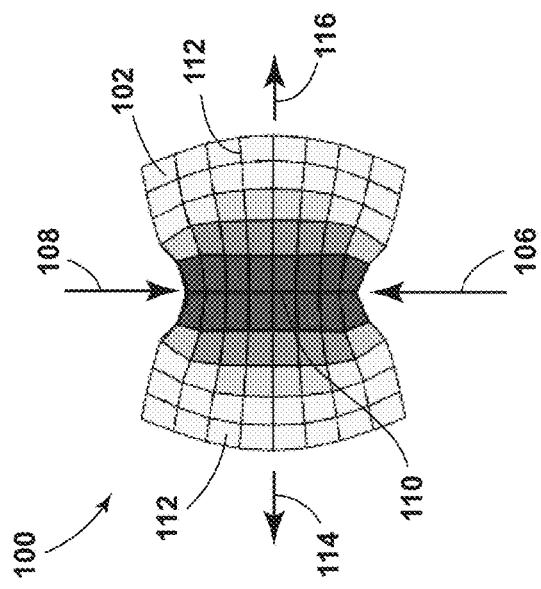
FIGS. 5B, 5C, 5D, and 5E generally illustrate soft tissue of a user subjected to various forces and/or pressures according to teachings of the present disclosure.
Figure 5C:
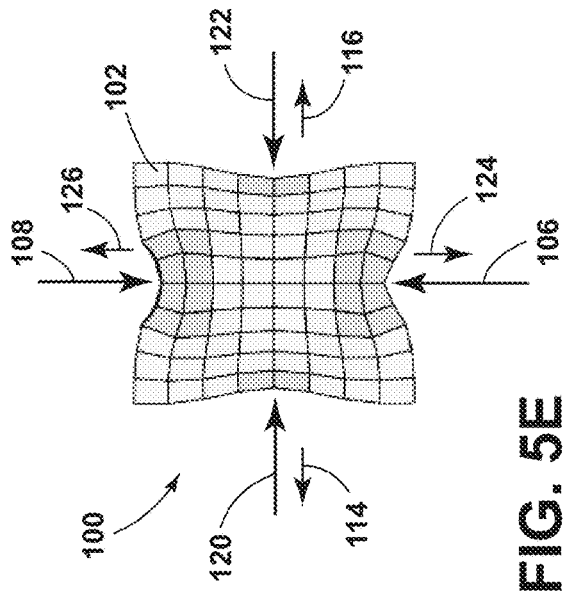
Figure 5D:
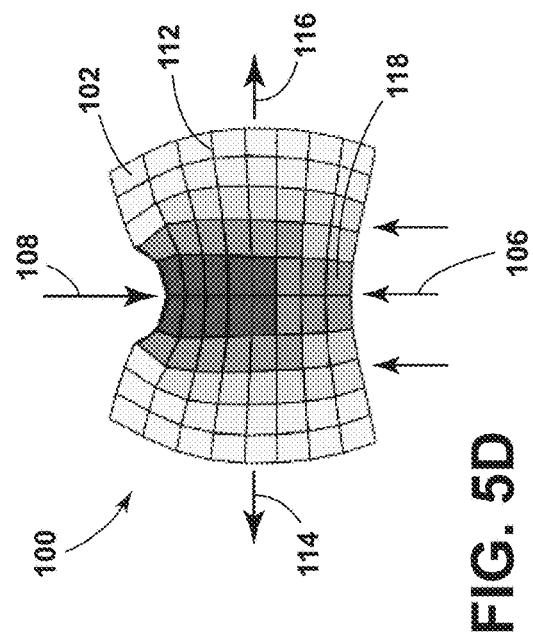
Figure 5E:
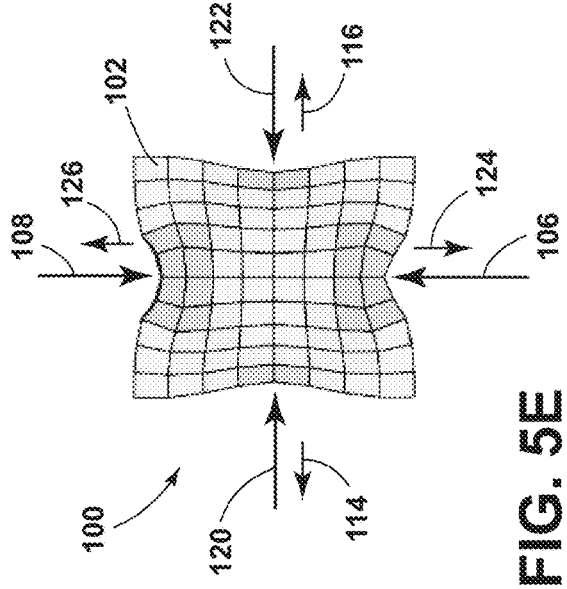

With embodiments, such as generally shown in FIG. 5A, a user 100 may generally have a physiological structure/composition comprising soft tissue 102 surrounding/proximate one or more bones 104. Soft tissue 102 may include skin 102A, fat 102B, and/or muscle 102C. It may be desirable to limit the stress applied to the soft tissue 102. For example, soft tissue may be substantially undistorted at equilibrium, as generally depicted in FIG. 5B, such as when a user 100 is standing. Generally, soft tissue 102 may be more resistant to compression than distortion/shear stress and, thus, soft tissue 102 may be more likely to become distorted than compressed when stressed (e.g., subjected to a force). When a user 100 sits on a seat 22, for example, the seat 22 may apply a resistive force 106 to the soft tissue 102 of a user 100, which may subject the soft tissue 102 to concentrated stresses and/or pressure, such as at the point where the force 106 is applied to the soft tissue 102, and may cause the soft tissue 102 to become deformed (e.g., distort, compress, etc.). For example, as generally depicted in FIG. 5C, the soft tissue 102 may be subjected to a force 106 from the seat 22 and a force 108 from another portion of a user 100 (e.g., bone 104) in opposite directions, which may cause areas of the soft tissue 102 to experience a substantial amount of stress. In turn, the soft tissue 102 disposed between forces 106, 108 may become compressed (e.g., compressed soft tissue 110) and the adjacent soft tissue (e.g., bulging soft tissue 112) may become distorted and bulge away from the area of the compressed soft tissue 110 (e.g., in directions 114, 116). In areas of soft tissue 102 experiencing a substantial amount of stress, blood vessels and/or capillaries in the soft tissue 102 may be constricted and/or blood flow to and/or within the soft tissue 102 may be restricted (e.g., ischemia). As generally shown in FIG. 5D, modifying and/or redistributing a force (e.g., force 106) applied to the soft tissue 102, such as by manipulating the location and/or size of the area to which the force 106 is applied to the soft tissue 102, may modify/redistribute the resulting pressure across a greater volume, mass, area, etc. of soft tissue 102 and thereby reduce the amount of stress within certain areas of the soft tissue 102. The resulting reduction in soft tissue stress may be isolated to certain areas of the soft tissue 102, such as an area nearest to where a force is applied to the soft tissue 102 (e.g., area 118), and at least some other areas of the soft tissue 102 may still experience a significant amount of stress and/or soft tissue bulging may still occur. As generally shown in FIG. 5E, applying one or more opposing forces 120, 122 to the bulging soft tissue 112 (e.g., in opposite directions 114, 116) may restrict and/or eliminate the tissue bulging produced by the forces 106, 108 and/or may produce tissue bulging in direction(s) 124, 126 opposite the forces 106, 108, which may at least partially resist and/or counteract the forces 106, 108. In this manner, soft tissue stress may be reduced and/or blood flow to the soft tissue 102 may be increased.

With embodiments, an ECU 16 may be configured to receive information from the sensor assembly 74, such as pressure data from the sensor arrays 76A, 76B, user data from the occupant sensor assembly 84, and/or inflation data from the fluid sensor 82. An ECU 16 may be configured to determine and/or estimate other information and/or characteristics of a user 100, such as body mass index (BMI), body fat percentage, and/or the shape and percentage of skin 102A, fat 102B, muscle 102C, bone 104, etc. in one or more regions 80, 80', based on the information collected by the occupant sensor assembly 84, the sensor arrays 76A, 76B, and/or the fluid sensor 82. An ECU 16 may be configured to generate a pressure distribution map 86 that represents, presents, identifies, characterizes, etc. the localized pressure in each region 80, 80' of a surface (e.g., the first surface 26D, the second surface 28D, etc.) of a seat 22 at a certain point in time. A pressure distribution map 86 may take any form to convey the desired information and may or may not be conveyed, presented, and/or displayed to a user 100. For example, a pressure distribution map 86 may be a series of numbers, an array/matrix, a table, an image, etc. stored within the ECU 16 or a memory connected thereto. An ECU 16 may generate a pressure distribution map 86 and/or related information based on the sensor assembly 74, the sensor arrays 76A, 76B, the occupant sensor assembly 84, and/or the fluid sensor 82.

Figure 6C:
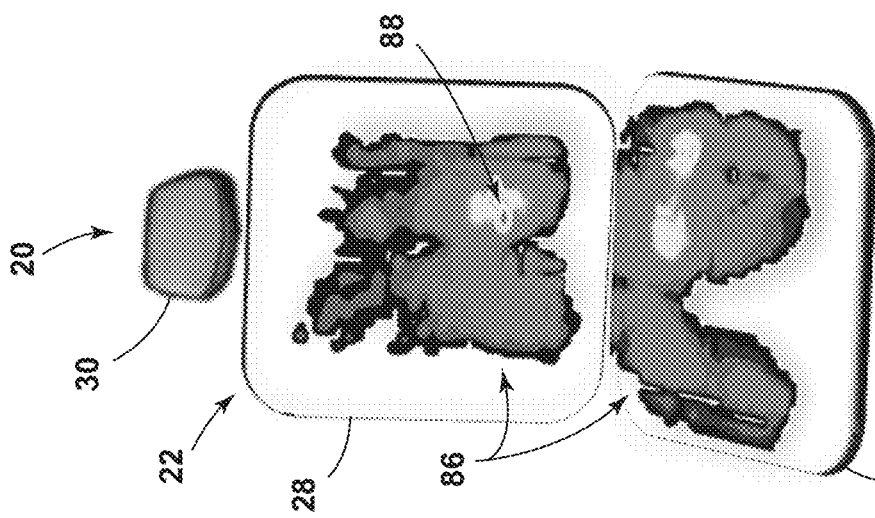
FIGS. 6A, 6B, and 6C generally illustrate pressure distribution maps based on a user's weight distribution on a seat assembly according to teachings of the present disclosure.
Figure 6B:
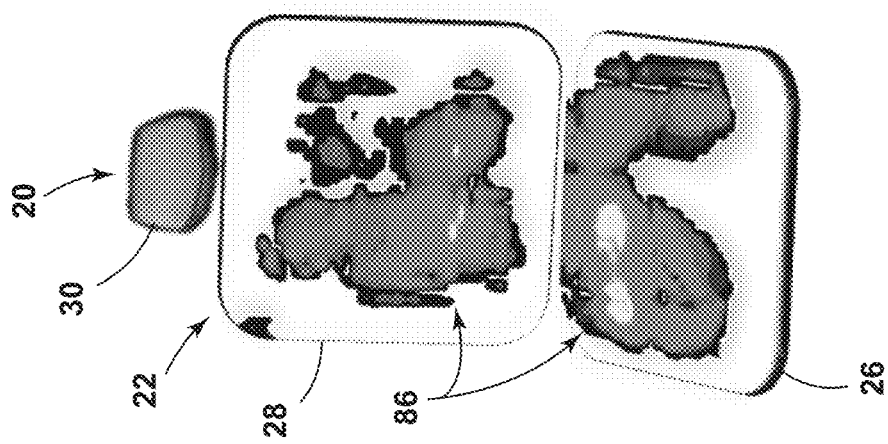
Figure 6A:
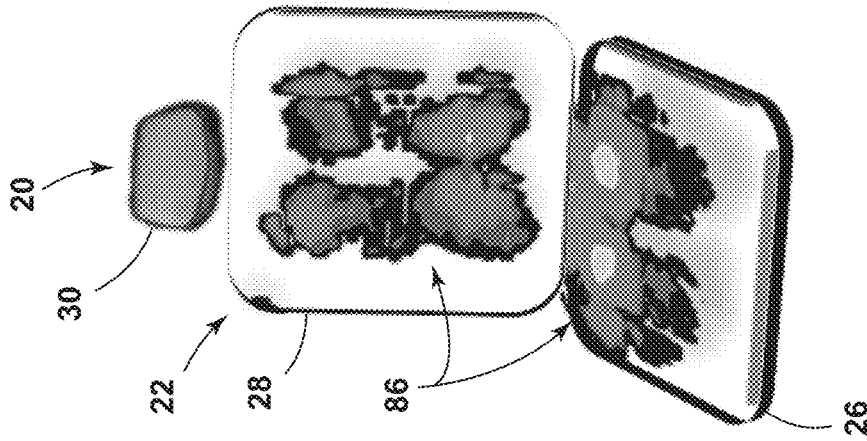

In embodiments, as generally shown in FIGS. 6A-6C, 7, and 8, a pressure distribution map 86 may include an image in which each region 80, 80' of the surface 26D, 28D is marked, identified, categorized, colored, etc. according to its detected localized pressure. Exemplary pressure distribution maps 86 of the first surface 26D and the second surface 28D are presented in FIGS. 6A-6C. FIG. 6A depicts an example of a pressure distribution map 86 in which a user 100 has a substantially centralized weight distribution. FIG. 6B depicts an example of a pressure distribution map 86 in which a user 100 has a rightward skewed/shifted weight distribution. FIG. 6C depicts an example of a pressure distribution map 86 in which a user 100 has a leftward skewed/shift weight distribution.

With embodiments, an ECU 16 may be configured to generate a model for one or more portions of a user 100. The model geometry may be parameterized (e.g., a parametric fixed element analysis model) to account for different body shapes and/or types. An ECU 16 may, for example and without limitation, utilize an Ogden model for the soft tissue 102, such as the skin 102A, fat 102B, muscle 102C, and/or other tissue. The model may, for example and without limitation, be based on a strain energy (w) function, $$w = \Sigma_{n=1}^{N} \frac{\mu_n}{\alpha_n} (\lambda_1^{\alpha_n} + \lambda_2^{\alpha_n} + \lambda_3^{\alpha_n} - 3),$$

with $\lambda_i$ representing extension ratios in the principle strain directions, and $\mu_n$ and $\alpha_n$ representing material parameters. The model may, in some circumstances, only consider first order models (i.e., N=1). The strain energy function may, for example, be used to determine the second-Piola-Kirchoff stress and/or the Green Lagrange strain in the model. An ECU 16 may, for example, construct the model based on information provided by the sensor assembly 74 (e.g., the occupant sensor assembly 84, the sensor arrays 76A, 76B) and/or information entered by a user 100, such as via a user interface 72. In examples, an ECU 16 may be configured to determine the surface pressure of the soft tissue 112 associated with some regions or each region 80, 80' based on the region's detected localized pressure. An ECU 16 may be configured to determine an amount of stress (e.g., compressive stress, shear stress, von Mises stress, shear strain, etc.) experienced by the soft tissue 102 of each region 80, 80' of the surface 26D, 28D, for example, based on the model and/or the surface pressure of the soft tissue 102. Using a hierarchical multiscale mechanics approach, for example, an ECU 16 may determine a level or amount of capillary closure based on the von Mises stress and/or the shear strain. Based on the model and/or the surface pressure of the soft tissue 102, an ECU 16 may be configured to determine a stress/strain distribution in the soft tissue 102 of each region 80, 80' on a macro-scale level. An ECU 16 may be configured to determine a stress/strain distribution in the soft tissue 102 of each region 80, 80' at a micro-scale level based on, for example, large deformation theory, non-linear pseudo-incompressible mechanical behaviors of muscle fibers and endomysium using neo-Hookean energy functions. An ECU 16 may be configured to determine a number of closed capillaries within the soft tissue 102 of each region 80, 80' of the surface 26D, 28D, and/or blood flow to the soft tissue 102 of each region 80, 80' of the surface 26D, 28D, for example, based on the model, the macro-scale stress/strain distribution, the micro-scale stress/strain distribution, and/or the surface pressure of the soft tissue 102.

With embodiments, an ECU 16 may be configured to obtain/determine a pressure threshold for each region 80, 80'. Additionally and/or alternatively, a single pressure threshold applicable to all regions 80, 80' of the surfaces 26D, 28D may be obtained/determined. The pressure threshold (or specified pressure) may be substantially equal to an amount of pressure at which the soft tissue 102 may begin to experience a reduction in blood flow. In examples, the pressure threshold may vary from region 80, 80' to region 80, 80' based on the portion of a user's 100 body disposed thereon and/or the composition of the soft tissue 102 of the portion of the user's 100 body (e.g., percentage of skin 102A, fat 102B, muscle 102C, bone 104, etc.). For instance, a first seat base region, on which a user's 100 thigh is disposed, may have a first pressure threshold corresponding to the make-up of a user's 100 thigh, and a second seat back region, on which a user's 100 lower back is disposed, may have a second pressure threshold corresponding to a make-up of a user's 100 lower back. Generally, the pressure threshold may, for example and without limitation, be between about 3.5 kPa and about 50 kPa, inclusively, and/or may be about 11 kPa.

In embodiments, an ECU 16 may be configured to compare the localized pressure in each region 80, 80' of a surface 26D, 28D to the corresponding pressure threshold based on the portion of a user's 100 body disposed thereon and/or the soft tissue composition of the portion of a user's 100 body (e.g., percentage of skin 102A, fat 102B, muscle 102C, bone 104, etc.). For instance, an ECU 16 may compare a localized pressure of a first region, on which a user's 100 thigh is disposed, to a first pressure threshold for a thigh, and may compare a localized pressure of a second region, on which a user's 100 lower back is disposed, to a second pressure threshold for a lower back.

Figure 9:
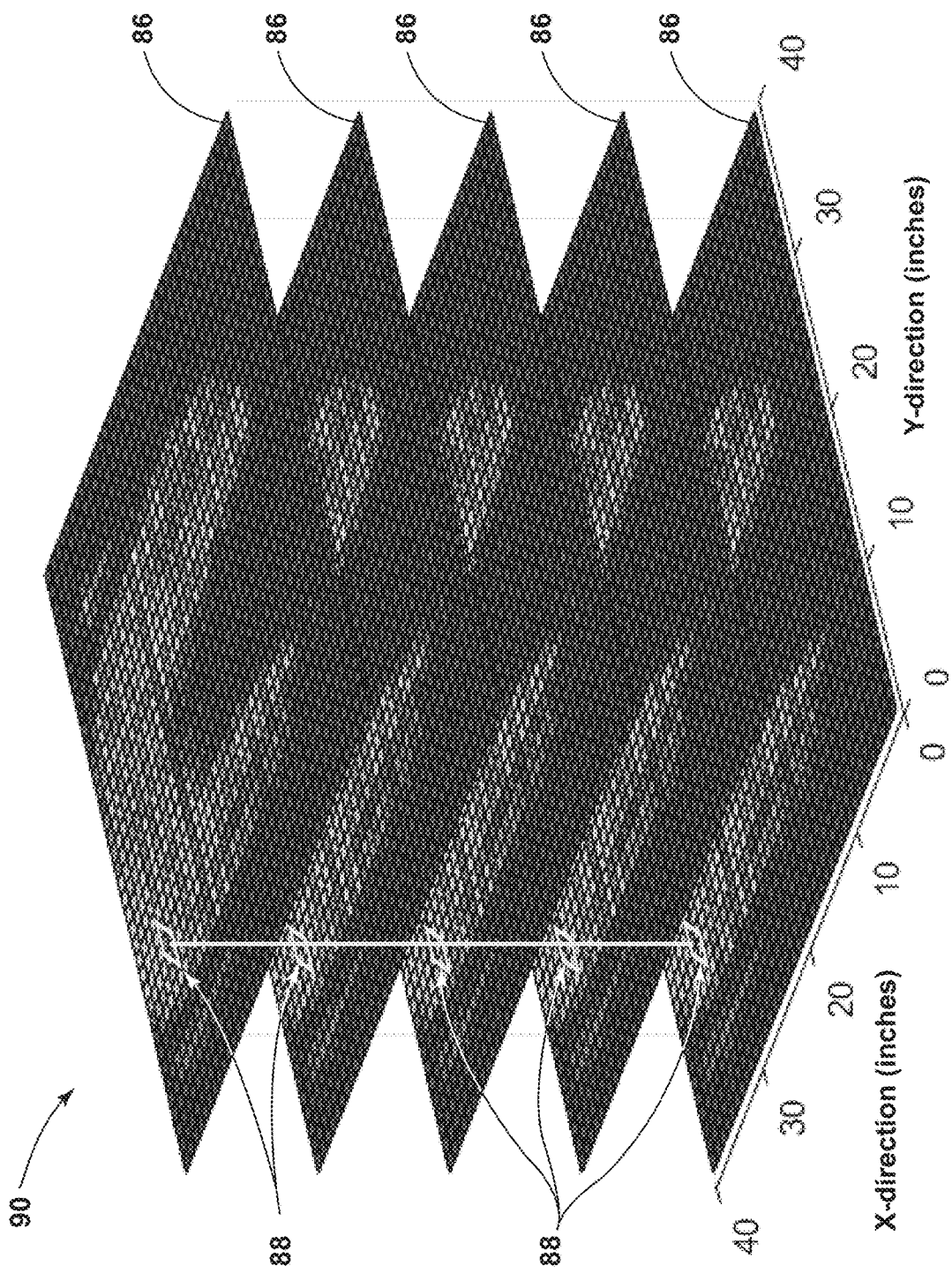
FIG. 9 is a representation including a pressure distribution stack comprising several pressure distribution maps obtained via an embodiment of a seat assembly according to teachings of the present disclosure.

With embodiments, as generally shown in FIGS. 6C and 9, an ECU 16 may be configured to detect peak pressure areas 88 in a pressure distribution map 86 and/or to outline a detected peak pressure area 88 in a pressure distribution map 86. Peak pressure areas 88 may be areas in which the localized pressure is substantially equal to and/or greater than a corresponding localized pressure threshold. To detect a peak pressure area 88, an ECU 16 may be configured to compare the localized pressure in each region 80, 80' of a surface 26D, 28D to a corresponding localized pressure threshold.

With embodiments, such as generally shown in FIG. 9, an ECU 16 may be configured to assemble a plurality of pressure distribution maps 86 into an pressure distribution stack 90, to track a detected peak pressure area 88 over the pressure distribution stack 90, and/or to analyze changes in a detected peak pressure area 88 over the pressure distribution stack 90. An ECU 16 may assemble a pressure distribution stack 90 from pressure distribution maps 86 spanning a desired time frame, such as a 2 second to 10 minute time frame, for example. In this manner, the ECU 16 may be configured able to track the localized pressure in each region 80, 80' of the surface 26D, 28D across a period of time.

With embodiments, an ECU 16 may be configured to control, activate, actuate, etc. the seat actuator 38, such as in response to detecting a peak pressure area 88, the prevalence of a detected peak pressure area 88 over a certain amount of time, and/or a rapid change in detected pressure (e.g., caused by shifting, fidgeting, and/or repositioning of a user 100, etc.). An ECU 16 may be configured to activate a seat actuator 38 to reduce soft tissue stress of the soft tissue 102, such as in one or more peak pressure areas 88 (e.g., via reducing the compressive stress, shearing stress, and/or deformation experienced by the soft tissue 102) and/or configured to increase blood flow to the soft tissue 102 to provide a user 100 with optimal/improved comfort. Activating the seat actuator 38 may include adjusting the position of a vehicle seat 22 in the X-direction, the Y-direction, and/or the Z-direction (e.g., raise and lower the seat 22), rotating the seat 22, tilting the seat 22 (e.g., the seat base 26), increasing/decreasing the angle $\theta_3$ between the seat base 26 and the seat back 28, raising/lowering a headrest 30, adjusting (e.g., sliding, pivoting, etc.) the leg support 36, actuating the fluid source 70, inflating and/or deflating one or more bladders 52A, 52B, 52C, 58A, 58B, 58C of the bladder assemblies 50, 56, and/or adjusting (e.g., repositioning, sliding, pivoting, etc.) the seat base 26, the seat back 28, and/or one or more of the bolsters 40A, 40B, 42A, 42B. For example and without limitation, an ECU 16 may be configured to adjust the seat base 26 and/or the seat back 28 via inflating and/or deflating the base bladders 52C and/or the back bladders 58C (e.g., via the fluid source 70) to increase and/or decrease the flexibility of and/or the support provided by the seat base 26 and/or the seat back 28 to a user 100.

In embodiments, an ECU 16 may be configured to adjust one or more of the base bolsters 40A, 40B to apply pressure/force to, further limit movement of, and/or provide increased support to lower portions of a user 100 (e.g., thighs, waist, hips, posterior, etc.). Additionally and/or alternatively, an ECU 16 may be configured to adjust one or more back bolsters 42A, 42B to apply pressure/force to, further limit movement of, and/or provide increased support to upper portions of a user 100 (e.g., torso, abdomen, the shoulders, neck, etc.). For example and without limitation, an ECU 16 may be configured to inflate and/or deflate the base-bolster bladders 52A, 52B and/or the back-bolster bladders 58A, 58B to adjust (e.g., slide, pivot, etc.) a position of, increase/decrease the flexibility of, and/or increase/decrease the support provided by the base bolsters 40A, 40B and/or the back bolsters 42A, 42B. In this manner, the bolster bladders 52A, 52B, 56A, 56B may apply a force and/or pressure to the soft tissue 102 of a user 100 to reduce soft tissue stress and/or reduce, restrict, prevent, etc. bulging of the soft tissue 102.

Figure 7:
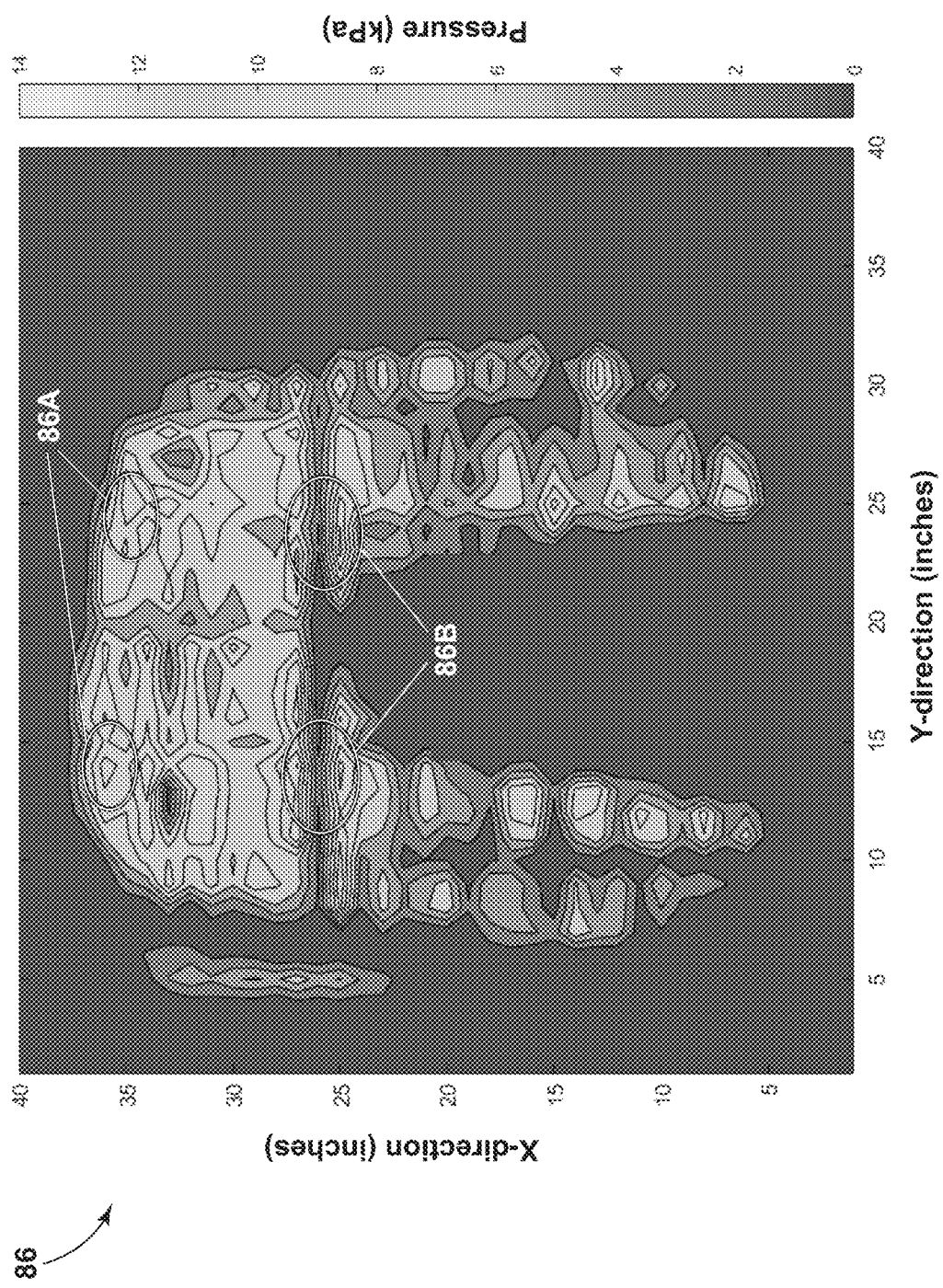
FIG. 7 is a representation of a pressure distribution map from a seat base obtained via embodiments of seat assemblies according to teachings of the present disclosure.

With embodiments, applying a force to a user 100 with the first base bolster 40A and a force to said user 100 with the second base bolster 40B that have Y-components extending in opposite directions (e.g., toward a user 100) may squeeze the user 100, which may reduce soft tissue stress and/or reduce, restrict, prevent, etc. bulging of the soft tissue 102 associated with one or more regions 80 (e.g., one or more regions 80 adjacent the main portion 26C). Applying a force to a user 100 with the first base bolster 40A and a force to the user 100 with the second base bolster 40B that each have a Z-component extending upward in the Z-direction (e.g., away from a mounting surface 12) may push said user 100 away from a portion of the seat base 26, which may decrease soft tissue stress and/or soft tissue surface pressure in one or more regions 80 (e.g., one or more regions 80 adjacent the main portion 26C). For example and without limitation, as generally illustrated in FIG. 7, activating the seat actuator 38 (e.g., to decrease the pressure of one or more bladders 52 of the first bladder assembly 50, to apply less force/pressure to a user 100 via the base bolsters 40A, 40B, etc.) may decrease soft tissue stress and/or soft tissue surface pressure in a first area 86A disposed near a spine of a user 100 and/or may increase soft tissue stress and/or soft tissue surface pressure in a second area 86B disposed near the legs of a user 100.

Figure 8:
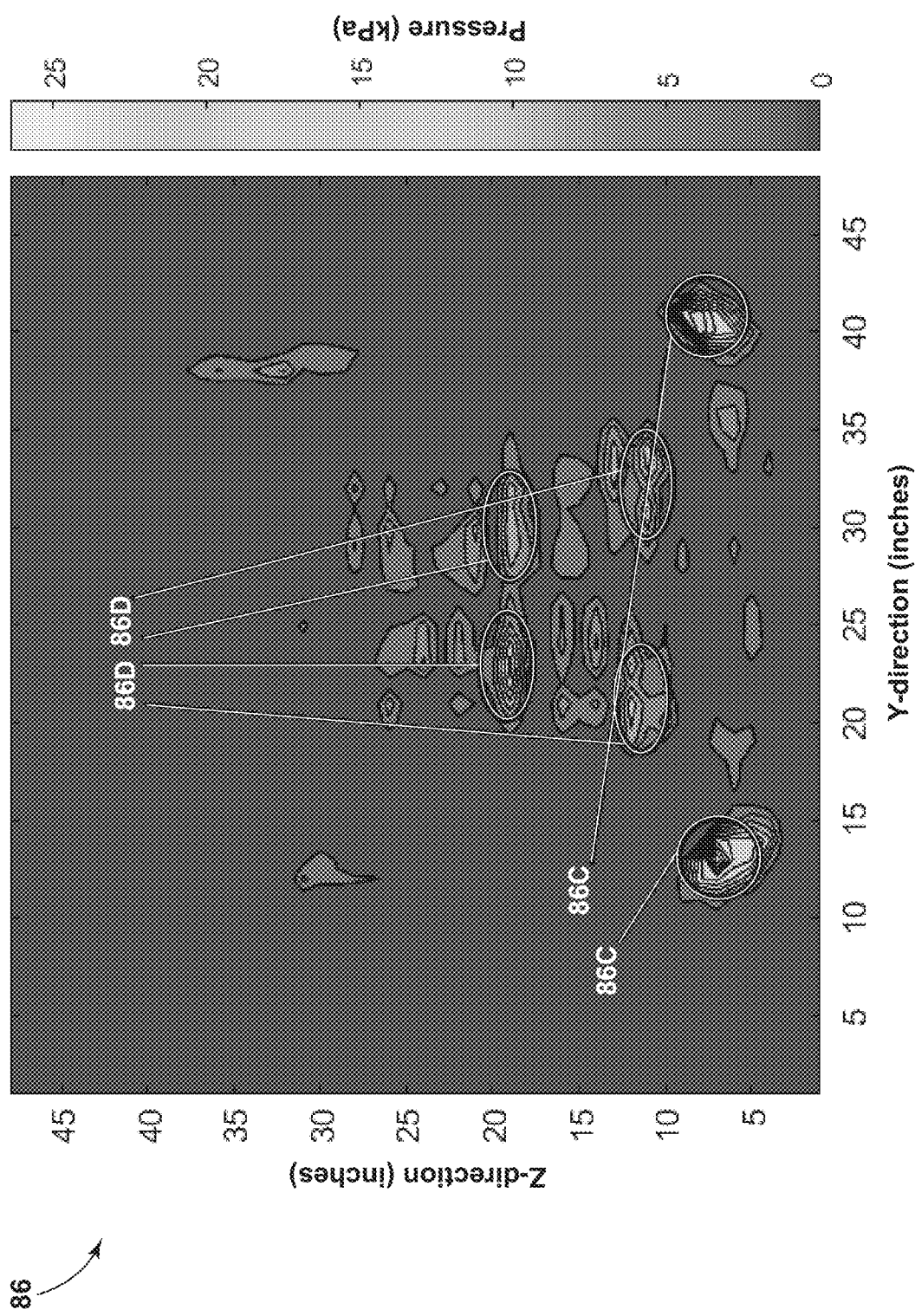
FIG. 8 is a representation of a pressure distribution map from a seat back obtained via embodiments of seat assemblies according to teachings of the present disclosure.

With embodiments, applying a force to a user 100 with the first back bolster 42A and a force to a user 100 with the second back bolster 42B that have Y-components extending in opposite directions (e.g., toward a user 100) may squeeze the said user 100, which may reduce soft tissue stress and/or reduce, restrict, prevent, etc. bulging of the soft tissue 102 associated with one or more regions 80' (e.g., one or more regions 80' adjacent the main portion 28C). Applying a force to a user 100 with the first back bolster 42A and a force to said user 100 with the second back bolster 42B that each have a X-component extending forward in the X-direction may push said user 100 away from a portion of the seat back 28, which may decrease soft tissue stress and/or soft tissue surface pressure in one or more regions 80' (e.g., one or more regions 80' adjacent the main portion 28C). As generally shown in FIG. 8, activating the seat actuator 38 (e.g., to decrease the pressure of one or more bladders 58 of the second bladder assembly 56, to apply less force/pressure to a user 100 via the back bolsters 42A, 42B, etc.) may decrease soft tissue stress and/or soft tissue surface pressure in a third area 86C disposed near the hips (e.g., the iliac crest) of a user 100 and/or may increase soft tissue stress and/or soft tissue surface pressure in a fourth area 86D disposed near the lower back of a user 100.

In embodiments, an ECU 16 may be configured to determine an optimum configuration of the seat 22 in which the blood flow reduction and/or soft tissue stress experienced by a user 100 is minimized. An ECU 16 may determine the optimum configuration of the seat 22 using a gradient based optimization algorithm. To obtain the optimum configuration of the seat 22, an ECU 16 may use the current configuration of the seat 22 (e.g., position, reclining angle, bladder inflation levels, etc.) as initial input parameters in the optimization algorithm. With examples, an ECU 16 may be configured to adjust the seat 22 to the determined optimum configuration via the seat actuator 38.

In embodiments, the ECU 16 may be configured to determine if the localized pressures of the regions 80, 80' in one or more of the detected peak pressure areas 88 have been reduced sufficiently (e.g., reduced below the pressure threshold). For example, the ECU 16 may monitor the localized pressures (e.g., via the sensor assembly 74, the sensor arrays, etc.), such as while the seat actuator 38 is active. If the ECU 16 determines that the localized pressures in each of the regions 80, 80' of the detected peak pressure area 88 have been sufficiently reduced, the ECU 16 may deactivate the seat actuator 38 to maintain the seat 22 in its current configuration. If the ECU 16 determines that the localized pressures in each of the regions 80, 80' of the detected peak pressure area 88 have not been sufficiently reduced, the ECU 16 may continue operation of the seat actuator 38. The ECU 16 may be configured to maintain the configuration of the seat assembly 20 and/or a level of inflation of the bladders 52, 58 while the seat 22 is occupied and no peak pressure areas 88 are detected. An ECU 16 may be configured to collect, store, and/or analyze information about a user 100 and predict the optimal way to adjust the seat 22 to reduce deformation of and/or increase blood flow to the soft tissue 102 of a user 100 based on the collected information.

Figure 10:
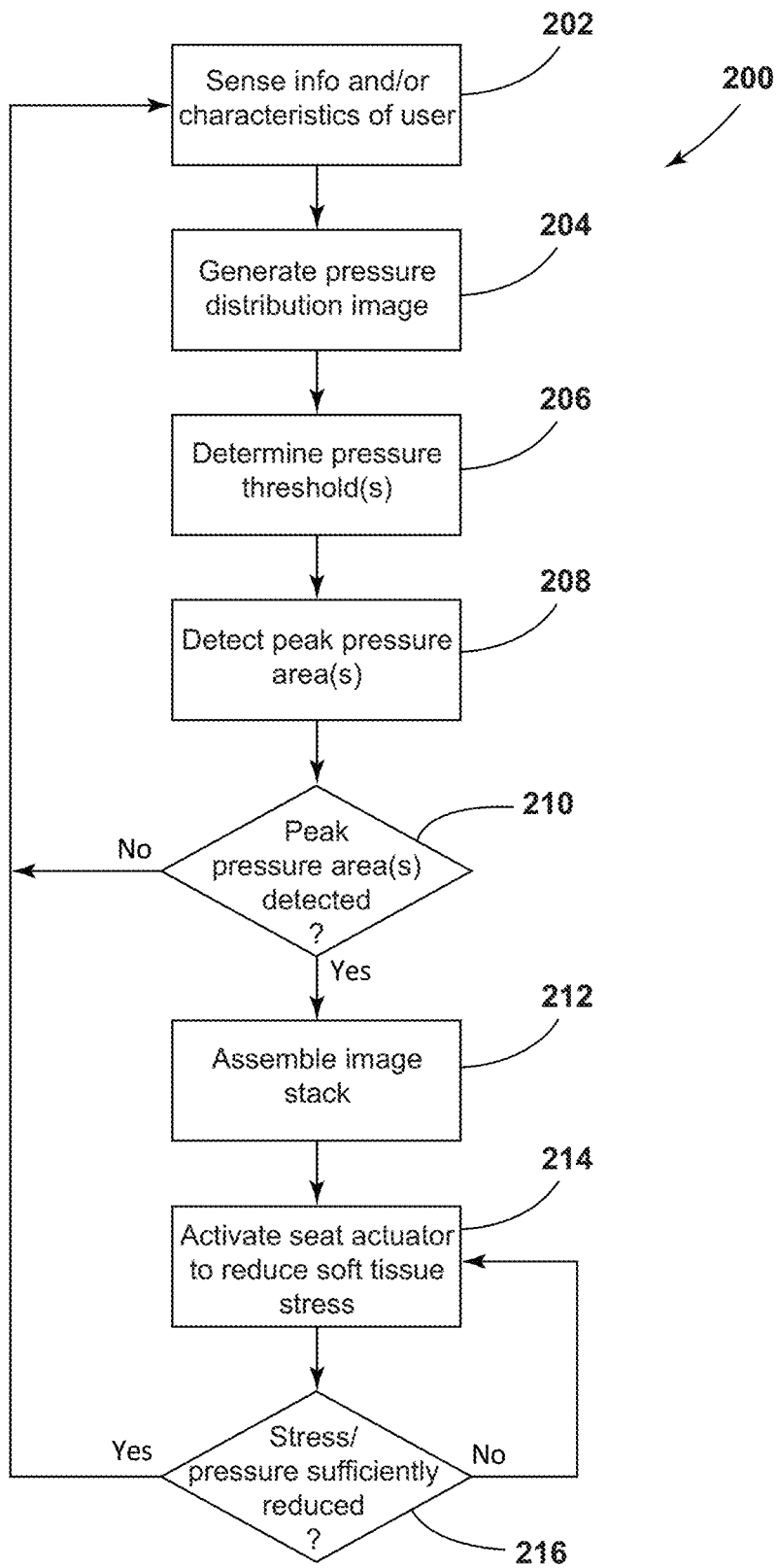
FIG. 10 is a flowchart generally illustrating an embodiment of a method of operating a seat assembly according to teachings of the present disclosure.

In embodiments, such as generally illustrated in FIG. 10, a method 200 of operating a seat assembly 20 may include sensing information and/or characteristics of a user 100 occupying a seat 22 (e.g., via the occupant sensor assembly 84) and/or detecting a pressure applied to a seat 22 (e.g., via one or more sensor arrays 76A, 76B) at block 202. Sensing information and/or characteristics of a user 100 may, for example and without limitation, include identifying a user 100 and/or detecting the gender, height, weight, anthropometric measures, etc. of a user 100. Sensing information and/or characteristics of a user may, additionally and/or alternatively, include determining and/or estimating other information and/or characteristics of a user 100 (e.g., body mass index, body fat percentage, and/or the shape and percentage of skin 102A, fat 102B, muscle 102C, bone 104, etc. in one or more portions of a user 100) with the ECU 16 based on the information collected by the occupant sensor assembly 84. Detecting a pressure applied to a seat 22 may include detecting a localized pressure applied to each region 80 of the first surface 26D by a user 100 via the first sensor array 76A and/or detecting a localized pressure applied to each region 80' of the second surface 28D by a user 100 via the second sensor array 76B.

With embodiments, the method 200 may include, at block 204, generating via the ECU 16 a pressure distribution map 86 depicting the localized pressure in each region 80 of the first surface 26D at a certain point in time and/or generating a pressure distribution map 86 depicting the localized pressure in each region 80' of the second surface 28D at a certain point in time. Generating a pressure distribution map 86 may include marking, identifying, categorizing, etc. each region 80, 80' of a surface 26D, 28D in the pressure distribution map 86 according to its detected localized pressure.

With embodiments, the method 200 may include, at block 206, determining a pressure threshold for one or more regions 80, 80' (e.g., a localize pressure threshold for each region 80, 80') of a surface 26D, 28D via the ECU 16. Determining a pressure threshold may include generating a model (e.g., a fixed element analysis model) for one or more portions of a user 100 based on information provided by the sensor assembly 74 (e.g., the occupant sensor assembly 84, the sensor arrays 76A, 76B) and/or information entered by a user 100, such as via a user interface 72. Determining a pressure threshold may include determining the surface pressure of the soft tissue 112 associated with each region 80, 80' based on the region's detected localized pressure. Determining a pressure threshold may include determining an amount of stress (e.g., compressive stress, shear stress, von Mises stress, shear strain, etc.) experienced by the soft tissue 102 of a region 80, 80' of a surface 26D, 28D, a macro-scale stress/strain distribution in the soft tissue 102, a micro-scale stress/strain distribution in the soft tissue, a number of closed capillaries within the soft tissue 102 of a region 80, 80' of the surface 26D, 28D, and/or blood flow reduction within the soft tissue 102 of a region 80, 80' of the surface 26D, 28D based on the generated model and/or the determined surface pressure of the associated soft tissue 102.

With embodiments, the method 200 may include, at block 208, detecting and/or outlining (e.g., with an arbitrary matrix) a peak pressure area 88 in a pressure distribution map 86 via the ECU 16. Detecting a peak pressure area 88 in a pressure distribution map 86 may include comparing the localized pressure in a region 80, 80' of a surface 26D, 28D to the corresponding pressure threshold. Detecting a peak pressure area 88 in a pressure distribution map 86 may include identifying each region 80, 80' of a surface 26D, 28D in which the localized pressure is substantially equal to and/or greater than the corresponding pressure threshold.

With embodiments, at block 210, if the ECU 16 did not detect any peak pressure areas 88 in the pressure distribution map 86, the method 200 may return to and repeat the processes of block 202. If the ECU 16 did detect a peak pressure area 88 in the pressure distribution map 86, the method 200 proceed to block 212.

With embodiments, the method 200 may include, at block 212, assembling a pressure distribution stack 90 including several pressure distribution maps 86 from one or more certain periods of time, tracking a detected peak pressure area 88 over the pressure distribution stack 90, and/or analyzing changes in the detected peak pressure area 88 over the pressure distribution stack 90 via the ECU 16. Assembling a pressure distribution stack 90 may include selecting a period of time during which one or more peak pressure areas 88 are frequently and/or consistently detected.

With embodiments, the method 200 may include, at block 214, activating a seat actuator 38 via an ECU 16 to reduce an amount of stress experienced by soft tissue 102 in the peak pressure area 88 (e.g., via reducing the compressive stress and/or shearing stress experienced by the soft tissue 102) and/or increase blood flow proximate the soft tissue 102 to provide a user 100 with optimal comfort. This may include determining an optimum configuration of the seat 22 in which the blood flow reduction and/or soft tissue stress experienced by a user 100 is minimized/reduced via an ECU 16 and/or activating a seat actuator 38 to adjust the seat 22 to the determined optimum configuration. Activating a seat actuator 38 may include reducing, restricting, preventing, etc. bulging of the soft tissue 102. Activating/actuating a seat actuator 38 may include adjusting the position of a seat 22 increasing/decreasing the angle $\theta_3$ between the seat base 26 and the seat back 28, adjusting the leg support 36, actuating the fluid source 70, inflating and/or deflating one or more bladders 52, 58 of the bladder assemblies 50, 56, and/or adjusting the seat base 26, the seat back 28, and/or one or more of the bolsters 40A, 40B, 42A, 42B. Adjusting the seat base 26 and/or the seat back 28 may include increasing and/or decreasing the flexibility of and/or the support provided by the seat base 26 and/or the seat back 28, which may include activating/actuating the seat actuator 38 and/or the fluid source 70 to inflate and/or deflate one or more of the base bladders 52C and/or the back bladders 58C. Adjusting one or more bolsters 40A, 40B, 42A, 42B may include adjusting one or more base bolsters 40A, 40B to apply pressure to, further limit movement of, and/or provide increased support to lower portions of a user 100 (e.g., thighs, waist, hips, posterior, etc.) and/or adjusting one or more back bolsters 42A, 42B to apply pressure to, further limit movement of, and/or provide increased support to upper portions of a user 100 (e.g., torso, abdomen, the shoulders, neck, etc.). Adjusting one or more base bolsters 40A, 40B may include inflating and/or deflating the first base-bolster bladder 52A and/or the second base-bolster bladder 52B to apply pressure and/or force (e.g., via the base bolsters 40A, 40B) to lower portions of a user 100 to reduce, restrict, prevent, etc. bulging of the soft tissue 102. Adjusting one or more back bolsters 42A, 42B may include inflating and/or deflating the first back-bolster bladder 58A and the second back-bolster bladder 58B to apply pressure and/or force to upper portions of a user 100 to reduce, restrict, prevent, etc. bulging of the soft tissue 102.

With embodiments, the method 200 may include, at block 216, determining if the localized pressure of the regions 80, 80' in one or more of the detected peak pressure areas 88 have been sufficiently reduced (e.g., reduced below the respective localized pressure threshold) via an ECU 16. Determining if the localized pressure of the regions 80, 80' in one or more of the detected peak pressure areas 88 have been sufficiently reduced may include monitoring the soft tissue pressure of a user 100 (e.g., by continuously repeating the processes of one or more of blocks 202-212) while the seat actuator 38 is active. If the ECU 16 determines that the localized pressure of the regions 80, 80' in one or more of the detected peak pressure areas 88 have not been sufficiently reduced, the ECU 16 may continue operation of the seat actuator 38 by looping back to block 214. If the localized pressure of the regions 80, 80' in one or all of the detected peak pressure areas 88 have been sufficiently reduced, the ECU 16 may deactivate the seat actuator 38 to maintain the configuration of the seat assembly 20 and/or the method 200 may return to and repeat the processes of block 202.

In examples, an ECU (e.g., ECU 16) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and"

and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (e.g., ECU 16), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of operating a seat assembly including a seat having a plurality of regions, a seat actuator connected to the seat, a sensor assembly connected to the seat, and an electrical control unit (ECU) operatively connected to the seat actuator and the sensor assembly, the sensor assembly including a pressure sensor array connected to the seat, the method comprising:
    obtaining information about a user via an occupant sensor of the sensor assembly;
    generating a model for at least one portion of a body of said user based on the obtained information;
    determining, via the ECU, an expected composition of soft tissue of said at least one portion of said body that is associated with the plurality of regions of the seat based on the model;
    detecting a pressure applied to the seat by said user via the sensor assembly;
    comparing the detected pressure to a pressure threshold via the ECU; and
    if the detected pressure exceeds the pressure threshold, reducing soft tissue stress in said soft tissue of said user via adjusting the seat via the seat actuator;
    wherein the plurality of regions are subjected to a respective localized pressure by the pressure applied to the seat by said user; and
    detecting the pressure applied to the seat includes detecting the respective localized pressures of the plurality of regions of the seat via the pressure sensor array.

2. The method of claim 1, wherein the pressure threshold corresponds to a pressure level at which a reduction of blood flow in the soft tissue is expected to occur.

3. The method of claim 1, wherein reducing the soft tissue stress includes reducing lateral bulging of the soft tissue.

4. The method of claim 3, wherein:
    reducing the lateral bulging of the soft tissue includes adjusting an amount of lateral force applied to said user by a first bolster and a second bolster;
    adjusting the seat with the seat actuator includes adjusting a position of at least one of the first bolster and the second bolster;
    the first bolster and the second bolster are disposed at opposite sides of the seat;
    the seat actuator includes a bladder assembly;
    the bladder assembly includes a first bolster bladder associated with the first bolster and a second bolster bladder associated with the second bolster; and
    adjusting the position of at least one of the first bolster and the second bolster includes adjusting a respective inflation level of at least one of the first bolster bladder and the second bolster bladder.

5. The method of claim 1, wherein generating the model for the at least one portion of the body of said user includes:
    utilizing an Ogden model for the soft tissue; and
    determining at least one of a second-Piola-Kirchoff stress and/or a Green Lagrange strain.

6. The method of claim 1, further comprising:
    generating, via the ECU, a pressure distribution map of the respective localized pressures of the plurality of regions at a certain point in time; and
    detecting a peak pressure area in the pressure distribution map via comparing the detected pressure to the pressure threshold.

7. The method of claim 1, wherein:
    the pressure threshold includes a plurality of localized pressure thresholds corresponding to a respective region of the plurality of regions;
    comparing the detected pressure to the pressure threshold includes comparing the respective localized pressure of the plurality of regions to a respective localized pressure threshold of the plurality of localized pressure thresholds; and
    reducing the soft tissue stress includes reducing the respective localized pressure of at least one of the plurality of regions in which the respective localized pressure exceeds the respective localized pressure threshold.

8. The method of claim 6, further comprising:
    generating, via the ECU, a plurality of pressure distribution maps of the respective localized pressures of the plurality of regions at different points in time;
    assembling the pressure distribution map and the plurality of pressure distribution maps into a pressure distribution stack; and tracking the detected peak pressure area over the pressure distribution stack via the ECU.

9. The method of claim 1, further comprising the ECU utilizing the model and the expected composition to identify one or more capillaries of said user that are at least partially closed;
   wherein adjusting the seat via the seat actuator includes adjusting the seat to facilitate opening of the one or more capillaries.

10. The method of claim 1, wherein the model includes information or data pertaining to bone, muscle, fat, and skin tissue of said user.

11. The method of claim 1, wherein the pressure threshold includes a first localized pressure threshold corresponding to a first region of the plurality of regions and a second localized pressure threshold corresponding to a second region of the plurality of regions; and further comprising:
   determining the first localized pressure threshold based on the expected composition of the soft tissue associated with the first region; and
   determining the second localized pressure threshold based on the expected composition of the soft tissue associated with the second region;
   wherein comparing the detected pressure to the pressure threshold includes (i) comparing the respective localized pressure of the first region to the first localized pressure threshold, and (ii) comparing the respective localized pressure of the second region to the second localized pressure threshold.

\* \* \* \* \*